United States Patent
Dent et al.

(10) Patent No.: US 9,593,209 B2
(45) Date of Patent: Mar. 14, 2017

(54) PROCESS FOR PREPARING CLUSTERED FUNCTIONAL POLYORGANOSILOXANES, AND METHODS FOR THEIR USE

(75) Inventors: Stanton Dent, Midland, MI (US); Kai Su, Midland, MI (US); Lauren Tonge, Sanford, MI (US); James Tonge, Sanford, MI (US)

(73) Assignee: Dow Corning Corporation, Midland, MI (US)

( * ) Notice: Subject to any disclaimer, the term of this patent is extended or adjusted under 35 U.S.C. 154(b) by 58 days.

(21) Appl. No.: 13/508,375

(22) PCT Filed: Nov. 3, 2010

(86) PCT No.: PCT/US2010/055232
§ 371 (c)(1),
(2), (4) Date: Jun. 12, 2012

(87) PCT Pub. No.: WO2011/056832
PCT Pub. Date: May 12, 2011

(65) Prior Publication Data
US 2012/0245272 A1 Sep. 27, 2012

Related U.S. Application Data

(60) Provisional application No. 61/259,282, filed on Nov. 9, 2009.

(51) Int. Cl.
*C08G 77/20* (2006.01)
*C08G 77/50* (2006.01)
*C08L 83/14* (2006.01)

(52) U.S. Cl.
CPC ............. *C08G 77/50* (2013.01); *C08L 83/14* (2013.01)

(58) Field of Classification Search
CPC ......... C08G 77/12; C08G 77/20; C08L 83/04; C08L 83/00; C08F 8/00
USPC .............................................. 528/31, 32, 25
See application file for complete search history.

(56) References Cited

U.S. PATENT DOCUMENTS

| | | |
|---|---|---|
| 2,676,182 A | 4/1954 | Daudt et al. |
| 3,159,601 A | 12/1964 | Ashby |
| 3,220,972 A | 11/1965 | Lamoreaux |
| 3,296,291 A | 1/1967 | Chalk et al. |
| 3,337,510 A | 8/1967 | Klebe |
| 3,419,593 A | 12/1968 | Willing |
| 3,516,946 A | 6/1970 | Modic |
| 3,714,109 A | 1/1973 | Matherly et al. |
| 3,814,730 A | 6/1974 | Karstedt |
| 3,989,668 A | 11/1976 | Lee et al. |
| 4,087,585 A | 5/1978 | Schulz |
| 4,143,088 A | 3/1979 | Favre et al. |
| 4,279,717 A | 7/1981 | Eckberg et al. |
| 4,322,844 A | 3/1982 | Fellinger et al. |
| 4,348,454 A | 9/1982 | Eckberg et al. |
| 4,611,042 A | 9/1986 | Rivers-Farrell et al. |
| 4,681,963 A | 7/1987 | Lewis |
| 4,705,765 A | 11/1987 | Lewis |
| 4,726,964 A | 2/1988 | Isobe et al. |
| 4,737,562 A | 4/1988 | Chaudhury et al. |
| 4,742,103 A | 5/1988 | Morita et al. |
| 4,753,977 A | 6/1988 | Merrill |
| 4,766,176 A | 8/1988 | Lee et al. |
| 4,766,183 A | 8/1988 | Rizk et al. |
| 4,774,310 A | 9/1988 | Butler |
| 4,784,879 A | 11/1988 | Lee et al. |
| 4,962,076 A | 10/1990 | Chu et al. |
| 4,987,158 A | 1/1991 | Eckberg |
| 5,017,654 A | 5/1991 | Togashi et al. |
| 5,034,491 A | 7/1991 | Wewers et al. |
| 5,036,117 A | 7/1991 | Chung et al. |
| 5,051,455 A | 9/1991 | Chu et al. |
| 5,053,422 A | 10/1991 | Pinza et al. |
| 5,053,442 A | 10/1991 | Chu et al. |
| 5,057,476 A | 10/1991 | Saruyama et al. |
| 5,075,038 A | 12/1991 | Cole et al. |
| 5,175,325 A | 12/1992 | Brown et al. |

(Continued)

FOREIGN PATENT DOCUMENTS

| | | |
|---|---|---|
| EP | 0347895 | 6/1989 |
| GB | 1101167 | 1/1968 |
| JP | 2008266483 A | 11/2008 |
| JP | 2008266485 A | 11/2008 |
| WO | 9840425 | 9/1998 |
| WO | 2004013403 | 4/2004 |
| WO | 2004037941 | 5/2004 |
| WO | 2008/133228 A1 | 11/2008 |

OTHER PUBLICATIONS

Freeman (Silicones, Published for the Plastics Institute, ILIFFE Books Ltd., 1962, p. 27).*
Jing Jiang, et al., U.S. Appl. No. 14/766,769, filed Aug. 10, 2015.
Kent Larson, et al., U.S. Appl. No. 14/766,770, filed Aug. 10, 2015.
Glenn Gordon, et al., U.S. Appl. No. 14/766,771, filed Aug. 10, 2015.
Thomas Bekemeier, et al., U.S. Appl. No. 14/766,773, filed Aug. 10, 2015.
Arianne Tan, et al., U.S. Appl. No. 14/766,774, filed Aug. 10, 2015.
Yin Tang, et al., U.S. Appl. No. 14/766,789, filed Aug. 10, 2015.
Jing Jiang, et al., U.S. Appl. No. 14/766,775, filed Aug. 10, 2015.

*Primary Examiner* — Kuo-Liang Peng
(74) *Attorney, Agent, or Firm* — Matthew T. Fewkes

(57) ABSTRACT

A hydrosilylation process is used to prepare a polyorganosiloxane having clustered functional groups at the polyorganosiloxane chain terminals. The ingredients used in the process include a) a polyorganosiloxane having an average of at least 2 aliphatically unsaturated organic groups per molecule, b) a polyorganohydrogensiloxane having an average of 4 to 15 silicon atoms per molecule and at least 4 silicon bonded hydrogen atoms for each aliphatically unsaturated organic group in ingredient a), c) a reactive species having, per molecule at least 1 aliphatically unsaturated organic group and 1 or more curable groups; and d) a hydrosilylation catalyst. The resulting clustered functional polyorganosiloxane is useful in a curable silicone composition for electronics applications.

10 Claims, No Drawings

(56) References Cited

U.S. PATENT DOCUMENTS

| | | |
|---|---|---|
| 5,194,649 A | 3/1993 | Okawa |
| 5,198,476 A | 3/1993 | Kobayashi et al. |
| 5,200,543 A | 4/1993 | Inomata et al. |
| 5,248,715 A | 9/1993 | Gray et al. |
| 5,254,645 A | 10/1993 | King et al. |
| 5,298,589 A | 3/1994 | Buese et al. |
| 5,364,921 A | 11/1994 | Gray et al. |
| 5,397,813 A | 3/1995 | Eckberg et al. |
| 5,412,055 A | 5/1995 | Loo |
| 5,459,206 A | 10/1995 | Somemiya et al. |
| 5,473,026 A | 12/1995 | Strong et al. |
| 5,525,696 A | 6/1996 | Herzig et al. |
| 5,536,803 A | 7/1996 | Fujiki et al. |
| 5,545,831 A | 8/1996 | Kaiya et al. |
| 5,567,883 A | 10/1996 | Nara |
| 5,580,925 A | 12/1996 | Iwahara et al. |
| 5,691,435 A | 11/1997 | Herzig et al. |
| 5,696,209 A | 12/1997 | King et al. |
| 5,736,619 A | 4/1998 | Kane et al. |
| 5,744,507 A | 4/1998 | Angell et al. |
| 5,985,462 A | 11/1999 | Herzig et al. |
| 6,013,701 A | 1/2000 | Kunimatsu et al. |
| 6,030,919 A | 2/2000 | Lewis |
| 6,093,782 A | 7/2000 | Herzig et al. |
| 6,127,502 A | 10/2000 | Krahnke et al. |
| 6,160,150 A | 12/2000 | Krahnke et al. |
| 6,169,142 B1 | 1/2001 | Nakano et al. |
| 6,252,100 B1 | 6/2001 | Herzig |
| 6,297,340 B1 | 10/2001 | Tachikawa |
| 6,303,729 B1 | 10/2001 | Sato |
| 6,313,255 B1 | 11/2001 | Rubinsztajn |
| 6,349,312 B1 | 2/2002 | Fresko et al. |
| 6,777,512 B1 | 8/2004 | Sonnenschein et al. |
| 6,806,330 B1 | 10/2004 | Sonnenschein et al. |
| 7,026,399 B2 | 4/2006 | Kim et al. |
| 7,253,307 B1 | 8/2007 | Carlson, Jr. et al. |
| 7,378,482 B2 | 5/2008 | Asch et al. |
| 7,429,636 B2 | 9/2008 | Asch et al. |
| 7,432,338 B2 | 10/2008 | Chapman et al. |
| 7,440,536 B2 | 10/2008 | Bruder et al. |
| 7,449,536 B2 | 11/2008 | Chapman et al. |
| 7,687,585 B2 | 3/2010 | Karthauser |
| 7,700,712 B2 * | 4/2010 | Zech ............... A61K 6/10 528/31 |
| 7,850,870 B2 | 12/2010 | Ahn et al. |
| 7,906,605 B2 | 3/2011 | Cray et al. |
| 7,932,319 B2 | 4/2011 | Yamamoto et al. |
| 8,110,630 B2 | 2/2012 | Lin et al. |
| 8,168,737 B2 | 5/2012 | Alvarez et al. |
| 8,580,073 B2 | 11/2013 | Behl et al. |
| 8,618,211 B2 | 12/2013 | Bhagwagar et al. |
| 8,889,261 B2 | 11/2014 | Carbary et al. |
| 9,045,647 B2 | 6/2015 | Kleyer et al. |
| 2003/0171487 A1 | 9/2003 | Ellsworth et al. |
| 2007/0004858 A1 * | 1/2007 | Zech et al. ............... 524/860 |
| 2007/0289495 A1 | 12/2007 | Cray et al. |
| 2010/0092690 A1 | 4/2010 | Alvarez et al. |
| 2010/0183525 A1 | 7/2010 | Lin |
| 2012/0245272 A1 | 9/2012 | Dent et al. |

\* cited by examiner

PROCESS FOR PREPARING CLUSTERED FUNCTIONAL POLYORGANOSILOXANES, AND METHODS FOR THEIR USE

CROSS REFERENCE TO RELATED APPLICATIONS

This application is a U.S. national stage filing under 35 U.S.C. §371 of PCT Application No. PCT/US10/055232 filed on 3 Nov. 2010, currently pending, which claims the benefit of U.S. Provisional Patent Application No. 61/259,282 filed 9 Nov. 2009 under 35 U.S.C. §119 (e). PCT Application No. PCT/US10/055232 and U.S. Provisional Patent Application No. 61/259,282 are hereby incorporated by reference.

BACKGROUND

Technical Field

A process for preparing a clustered functional polyorganosiloxane comprises reacting an aliphatically unsaturated species, a species containing silicon bonded hydrogen atoms, and a reactive species in the presence of a hydrosilylation catalyst. The clustered functional polyorganosiloxane prepared by this process has improved physical properties (e.g., increased tensile strength and % elongation) as compared to a 'dumb-bell' type polyorganosiloxane prepared by a different process. The clustered functional polyorganosiloxane can contain a filler and still exhibit improved dispensing properties as well as the improved physical properties over a 'dumb-bell' type polyorganosiloxane prepared by a different process.

Background of the Invention

Polyorganosiloxane compositions that cure to elastomeric materials are well known. Such compositions may be prepared by mixing polydiorganosiloxanes having curable (e.g., hydrolyzable, radiation curable, or heat curable) groups with crosslinking agents and/or catalysts, as needed. Generally, the polydiorganosiloxanes may have 1 to 3 reactive groups per chain end. Compositions including these ingredients can then be cured, for example, by exposure to atmospheric moisture, exposure to radiation, or exposure to heat, depending on the curable groups present.

The cure rate of a particular composition depends on various factors including the type and number reactive group(s) present. It is known that different groups have different reactivities. For example, in the presence of moisture, a silicon-bonded acetoxy group will usually hydrolyze more rapidly than a silicon-bonded alkoxy group when all other conditions are the same. Furthermore, even the same type of curable group can have different reactivities depending on the number of those curable groups bonded to a particular silicon atom. For example, if a polydiorganosiloxane has three silicon-bonded alkoxy groups bonded to one silicon atom on a chain end, then the first alkoxy group is generally most reactive (reacts most quickly), but after the first alkoxy group reacts, it takes a longer time for the second alkoxy group bonded to the same silicon atom to react, and even longer for the third. Therefore, there is a continuing need to prepare clustered functional polyorganosiloxanes having more of the "most" reactive groups per molecular terminus.

Furthermore, to show utility for certain applications, such as silicone adhesive applications, a filler may be added to the composition to improve the physical property profile (e.g., increase tensile strength and increase % elongation to break) of the resulting cured product of the composition. The nature of the filler, its chemistry, particle size and surface chemistry have all been shown to influence the magnitude of the interaction between polyorganosiloxanes and the filler and consequently the ultimate physical properties. Other properties such as adhesion and dispensability also play a role in the performance and commercial acceptance of a composition for adhesive applications. Silicone adhesives generally have tensile properties in excess of 200 pounds per square inch (psi) and 100% elongation, with adhesion to a wide variety of metal, mineral and plastic surfaces.

The synthesis of 'dumb-bell' silicone polymers, in which long polymer chains are capped with cyclic, linear and star-shaped species having one or more organo-functional groups has been disclosed. Such polymers have been described which can undergo a number of cure chemistries, e.g., epoxy (glycidyl, alkylepoxy, and cycloaliphatic epoxy), methacrylate, acrylate, urethanes, alkoxy, or addition.

It is desirable to make multifunctional end blocked polymers (clustered functional polyorganosiloxanes) in which the curable groups are clustered at the ends/termini of the polymers. The combination of clustered functional groups with nonfunctional polymer chains separating them in the 'dumb-bell' silicone polymers may provide higher physical properties with the minimum drop in cure rate. This approach has been demonstrated for 'dumb-bell' silicone polymers in which the curable groups are the same (for example, all curable groups clustered at the polymer chain ends may be either epoxy or alkoxy). This approach has also been demonstrated for so called 'multiple cure' systems in which the curable groups differ, for example, all curable groups clustered at the polymer terminals may be a combination of epoxy and alkoxy groups.

In known processes for making these 'dumb-bell' silicone polymers, these polymers are prepared in multiple steps. First, a silicone hydride functional 'dumb-bell' intermediate is prepared via the reaction of vinyl-end blocked linear polyorganosiloxanes with cyclic, linear or branched silicone hydrides. This initial step is followed by the addition of a reagent to neutralize the platinum group metal catalyst and/or a purification step to remove the silicone hydride functional 'dumb-bell' intermediate from the unreacted species and by-products because continued presence of the catalyst at elevated temperatures over time leads to gelation, typically through the ring opening of the cyclic end blocks or crosslinking of the remaining silicon bonded hydrogen atoms. Several approaches to prevent gelation include using platinum group metal catalyst poisons, silylating agents, or catalyst inhibitors such as diallyl maleate, to deactivate the catalyst after the silicone hydride functional 'dumb-bell' intermediate is formed. This allows purification (e.g., by stripping or distillation) of the intermediate at elevated temperature to remove solvents, unreacted silicone hydrides, and reaction by-products. The problem with this solution is that it makes it necessary to add more platinum group metal catalyst (an added expense) and higher temperature, typically >80° C. for longer periods to achieve subsequent reactions with unsaturated organo-functional moieties, thereby increasing the time required to perform the process. The increased temperature can be particularly problematic in small 'dumb-bell' species in which a large exotherm is typically associated with the hydrosilylation process. The elevated initiation temperature and large exotherms make heat management in industrial process problematic. The unsaturated groups (e.g., methacrylate, acrylate, vinyl or allyl) can autopolymerize via unwanted radical process. These radical process can be mitigated by the addition of polymerization inhibitors such as hydroquinone (HQ), 4-methoxyphenol (MEHQ), butylated hydroxytoluene (BHT), phenothiazine (PTZ), etc. However, in the case of methacrylate functional materials even with radical inhibitors present there is a high incidence of methacrylate autopolymerization in this multiple step process. For these reasons, there is a need for a process with minimal process steps and minimal thermal history, as this may reduce or eliminate the tendency for ring opening and autopolymerization. This may allow greater latitude in organic functional groups, as well as reduce cost due to the additional platinum group metal catalyst and time consuming process steps associated with the known processes.

Furthermore, uses of the 'dumb-bell' silicone polymers produced by known the process described above have been limited due to the difficulties associated with formulating fillers with these polymers. The addition of fillers increases the physical properties of cured silicone products such as rubbers, sealants, and adhesives. The fillers, exemplified by fumed silica, used in such compositions are inherently hydrophilic due to surface silanol groups, which lead to severe problems in processing and use. The water affinity of the silanol groups can lead to dielectric breakdown, corrosion, and gelation of adhesion promoters, catalysts, and coupling agents. The silanol groups also lead to larger than required interactions between the polyorganosiloxanes and the silica surface that result in material with too high of a viscosity to dispense or handle, and which exhibits crepe hardening. It is therefore common practice to use fumed silica, which has been pretreated with hydrophobic species to mitigate these problems. These fillers can be pretreated by the silica manufacturers, e.g., Cabosil® TS-530 and TS-720 are fumed silicas treated with hexamethyldisilazane (HMDZ) and polydimethylsiloxane, respectively, from Cabot Specialty Chemicals, Inc. of Billerica, Mass., USA, or the fillers can be treated in situ as part of the production process.

Despite the advantages of fumed silica, product formulators have cited problems with both hydrophobic and hydrophilic forms of fumed silica. For example, because of its moisture-absorbing silanol groups, hydrophilic fumed silica tends to cause problems in electronic adhesives or coating applications because the increased water concentration decreases electrical resistance. Additionally, in coating applications, this moisture, introduced by the hydrophilic fumed silica, can accelerate corrosion of the coated substrate. Also, the shear-thinning efficiency of hydrophilic fumed silica is often inadequate, which is thought to result from adsorption of the liquid onto the fumed silica surface, preventing silica aggregation and thus shear-thinning.

It is possible to make the 'dumb-bell' polyorganosiloxanes first and then, in a subsequent process step, disperse a desired amount of filler to get high tensile properties. However, the shear encountered in dispersing the treated filler leads to the formation of new untreated silica, hence silanol groups, as the particles are broken and fractured. This may lead to instability in the rheology and storage properties of the 'dumb-bell' polyorganosiloxanes and may also reduce the adhesive properties of a composition containing the 'dumb-bell' polyorganosiloxanes, and cured products thereof, to metals. Fumed silicas can also be cumbersome to process during manufacture. When adding fumed silica to a composition containing a 'dumb-bell' polyorganosiloxane described above, even high shear blending may be insufficient to disperse the fumed silica particles. It is often necessary to add a process step where the fumed silica-polymer mixture must be passed through a media mill or a three-roll mill to sufficiently disperse the silica. Furthermore, there is the danger of overdispersing fumed silica which breaks the silica aggregates, exposing untreated silica surfaces, and ruining the shear-thinning properties. Eliminating the need for these extra process steps as well as avoiding the danger of overdispersing the silica would be highly desirable to product formulators. Therefore, there is a need in the electronics industry for a process to synthesize a clustered functional polyorganosiloxane in the presence of a treated filler.

BRIEF SUMMARY OF THE INVENTION

A process for preparing a clustered functional polyorganosiloxane includes reacting ingredients comprising:
  a) a polyorganosiloxane having an average of at least 2 aliphatically unsaturated organic groups per molecule;
  b) a polyorganohydrogensiloxane having an average of 4 to 15 silicon atoms per molecule; and
  c) a reactive species having, per molecule, at least one aliphatically unsaturated organic group and one or more curable groups;
in the presence of d) a hydrosilylation catalyst. The molar ratio of silicon bonded hydrogen atoms in ingredient b)/aliphatically unsaturated organic groups in ingredient a) (the $SiH_b/Vi_a$ ratio) ranges from 4/1 to 20/1. A product prepared by the process is a clustered functional polyorganosiloxane having more than one curable group at each terminus of the polyorganosiloxane of ingredient a). The clustered functional polyorganosiloxane prepared by the process may be used in a curable silicone composition.

DETAILED DESCRIPTION OF THE INVENTION

Definitions and Usage of Terms

The articles 'a', 'an', and 'the' each refer to one or more, unless otherwise indicated. All amounts, ratios, and percentages in this application are by weight, unless otherwise indicated. All kinematic viscosities were measured at 25° C., unless otherwise indicated.

Process

A process is useful for making a clustered functional polyorganosiloxane. The process may comprise:
1) concurrently reacting ingredients comprising
  a) a polyorganosiloxane having an average, per molecule, of at least 2 aliphatically unsaturated organic groups,
  b) a polyorganohydrogensiloxane having an average, per molecule, of 4 to 15 Si atoms and at least 4 silicon bonded hydrogen atoms per aliphatically unsaturated organic group in ingredient a), and
  c) a reactive species having, per molecule, at least 1 aliphatically unsaturated organic group and 1 or more curable groups;
in the presence of d) a hydrosilylation catalyst.
In this process, the ingredients in step 1) may further comprise e) a filler, f) a non-reactive silicone resin, or a combination thereof. The processes described above may optionally further comprise the steps of: 2) adding a catalyst inhibitor to deactivate the catalyst after step 1), and 3) purifying the product of step 2).

Alternatively, the process may comprise:
I) concurrently reacting ingredients comprising
   a) the polyorganosiloxane having an average, per molecule, of at least 2 aliphatically unsaturated organic groups; and
   b) the polyorganohydrogensiloxane having an average, per molecule, of 4 to 15 Si atoms and at least 4 silicon bonded hydrogen atoms per aliphatically unsaturated organic group in ingredient a),
in the presence of d) the hydrosilylation catalyst; and thereafter
II) reacting the product of step I) with an ingredient comprising:
   c) the reactive species having, per molecule, at least 1 aliphatically unsaturated organic group and one or more curable groups;
with the proviso that the ingredients in step I) and/or step II) further comprise e) a filler, f) a non-reactive silicone resin, or a combination thereof; and with the proviso that no intermediate purification step is performed between step I) and step II), and with the proviso that the $SiH_b/Vi_a$ ratio ranges from 4/1 to 20/1, and a product prepared by the process has, on average, more than one curable group at each terminus of the polyorganosiloxane of ingredient a). The process may optionally further comprise the steps of: III) adding a catalyst inhibitor to deactivate the catalyst after step II), and IV) purifying the product of step III).

The step of purifying the products in the above processes may be performed by any convenient means, such as stripping or distillation, optionally under vacuum.

Ingredients

The ingredients used in the process described above comprise:
a) a polyorganosiloxane having an average, per molecule, of at least 2 aliphatically unsaturated organic groups;
b) a polyorganohydrogensiloxane having an average of 4 to 15 silicon atoms per molecule;
c) a reactive species having, per molecule, at least 1 aliphatically unsaturated organic group and 1 or more curable groups; and
d) a hydrosilylation catalyst.

Ingredient a) Polyorganosiloxane

Ingredient a) is a polyorganosiloxane having an average, per molecule, of at least 2 aliphatically unsaturated organic groups, which are capable of undergoing a hydrosilylation reaction with a silicon bonded hydrogen atom of ingredient b). Ingredient a) may have a linear or branched structure. Alternatively, ingredient a) may have a linear structure. Ingredient a) may be a combination comprising two or more polyorganosiloxanes that differ in at least one of the following properties: structure, viscosity, degree of polymerization, and sequence.

Ingredient a) has a minimum average degree of polymerization (average DP) of 100. Alternatively, average DP of ingredient a) may range from 100 to 1000. The distribution DP of polyorganosiloxanes of ingredient a) can be bimodal. For example, ingredient a) may comprise one alkenyl terminated polydiorganosiloxane with a DP of 60 and another alkenyl terminated polydiorganosiloxane with a DP higher than 100, provided that average DP of the polydiorganosiloxanes ranges from 100 to 1000. However, suitable polyorganosiloxanes for use in ingredient a) have a minimum degree of polymerization (DP) of 10, provided that polyorganosiloxanes with DP less than 10 are combined with polyorganosiloxanes having DP greater than 100. Suitable polydiorganosiloxanes for ingredient a) are known in the art and are commercially available. For example, DOW CORNING® SFD-128 has DP ranging from 980 to 1000, DOW CORNING® SFD 120 has DP ranging from 120 to 700, DOW CORNING® 7038 has DP of 100 DP, DOW CORNING® SFD-119 has DP of 150. All of these are vinyl-terminated polydimethylsiloxanes are commercially available from Dow Corning Corporation of Midland, Mich., USA. When ingredient a) has a bimodal distribution, the polyorganosiloxane with the lower DP (low DP polyorganosiloxane) is present in a lower amount than the polyorganosiloxane with the higher DP (high DP polyorganosiloxane). For example, in a bimodal distribution, the ratio of low DP polyorganosiloxane/high DP polyorganosiloxane may range from 10/90 to 25/75.

Ingredient a) is exemplified by polyorganosiloxanes of formula (I), formula (II), or a combination thereof. Formula (I) is $R^1_2R^2SiO(R^1_2SiO)_a(R^1R^2SiO)_bSiR^1_2R^2$, and formula (II) is $R^1_3SiO(R^1_2SiO)_c(R^{1R2}SiO)_dSiR^1_3$. In these formulae, each $R^1$ is independently a monovalent organic group free of aliphatic unsaturation, each $R^2$ is independently an aliphatically unsaturated organic group, subscript a has an average value ranging from 2 to 1000, subscript b has an average value ranging from 0 to 1000, subscript c has an average value ranging from 0 to 1000, and subscript d has an average value ranging from 4 to 1000. In formulae (I) and (II), $10 \leq (a+b) \leq 1000$ and $10 \leq (c+d) \leq 1000$.

Suitable monovalent organic groups for $R^1$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl. Each $R^2$ is independently an aliphatically unsaturated monovalent organic group. $R^2$ may be an aliphatically unsaturated monovalent hydrocarbon group exemplified by alkenyl groups such as vinyl, allyl, propenyl, and butenyl; and alkynyl groups such as ethynyl and propynyl.

Ingredient a) may comprise a polydiorganosiloxane such as
i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylphenylsiloxane),
vii) dimethylvinylsiloxy-terminated poly(dimethylsiloxane/diphenylsiloxane),
viii) phenyl,methyl,vinyl-siloxy-terminated polydimethylsiloxane,
ix) dimethylhexenylsiloxy-terminated polydimethylsiloxane,
x) dimethylhexenylsiloxy-terminated poly(dimethylsiloxane/methylhexenylsiloxane),
xi) dimethylhexenylsiloxy-terminated polymethylhexenylsiloxane,
xii) trimethylsiloxy-terminated poly(dimethylsiloxane/methylhexenylsiloxane), or
xiii) a combination thereof.

Ingredient b) Polyorganohydrogensiloxane

Ingredient b) is a polyorganohydrogensiloxane having an average of 4 to 15 silicon atoms per molecule. Ingredient b) has an average of at least 4 silicon bonded hydrogen atoms per aliphatically unsaturated organic group in ingredient a). Ingredient b) may be cyclic, branched, or linear. Alternatively, ingredient b) may be cyclic. Ingredient b) may be a combination comprising two or more polyorganohydrogensiloxanes that differ in at least one of the following properties: structure, viscosity, degree of polymerization, and sequence.

Ingredient b) may be a cyclic polyorganohydrogensiloxane having an average of 4 to 15 siloxane units per molecule. The cyclic polyorganohydrogensiloxane may have formula (III), where formula (III) is $(R^3{}_2SiO_{2/2})_e(HR^3SiO_{2/2})_f$, in which
each $R^3$ is independently a monovalent organic group free of aliphatic unsaturation,
subscript e has an average value ranging from 0 to 10,
subscript f has an average value ranging from 4 to 15, and
a quantity (e+f) has a value ranging from 4 to 15, alternatively 4 to 12, alternatively 4 to 10, alternatively 4 to 6, and alternatively 5 to 6. Monovalent organic groups suitable for $R^3$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl.

Alternatively, ingredient b) may be a branched polyorganohydrogensiloxane. The branched polyorganohydrogensiloxane for ingredient b) may have formula (IV), where formula (IV) is $Si—(OSiR^4{}_2)_g(OSiHR^4)_{g'}$, $(OSiR^4{}_3)_h$ $(OSiR^4{}_2H)_{(4-h)}$, in which
each $R^4$ is independently a monovalent organic group free of aliphatic unsaturation,
subscript g has a value ranging from 0 to 10,
subscript g' has a value ranging from 0 to 10, and
subscript h has a value ranging from 0 to 1.
Alternatively, subscript g may be 0. When subscript g' is 0, then subscript h is also 0.
Monovalent organic groups suitable for $R^4$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl.

Alternatively, ingredient b) may be a linear polyorganohydrogensiloxane having an average of at least 4 silicon bonded hydrogen atoms per molecule. The linear polyorganohydrogensiloxane for ingredient b) may have a formula selected from (V), (VI), or a combination thereof, where $$R^5{}_2HSiO(R^5{}_2SiO)_i(R^5HSiO)_jSiR^5{}_2H, \quad \text{formula (V)}$$

$$R^5{}_3SiO(R^5{}_2SiO)_k(R^5HSiO)_mSiR^5{}_3; \quad \text{formula (VI)}$$

where
each $R^5$ is independently a monovalent organic group free of aliphatic unsaturation,
subscript i has an average value ranging from 0 to 12,
subscript j has an average value ranging from 2 to 12,
subscript k has an average value ranging from 0 to 12, and
subscript m has an average value ranging from 4 to 12
where $4 \leq (i+j) \leq 13$ and $4 \leq (k+m) \leq 13$.
Monovalent organic groups suitable for $R^5$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl.

Ingredient a) and ingredient b) may be present in amounts sufficient to provide a molar ratio of silicon bonded hydrogen atoms in ingredient b)/unsaturated organic groups in ingredient a) (commonly referred to as $SiH_b/Vi_a$ ratio) ranging from 4/1 to 20/1, alternatively 4/1 to 10/1, and alternatively 5/1 to 20/1. Without wishing to be bound by theory, it is thought that if $SiH_b/Vi_a$ ratio is 30/1 or higher, the ingredients may crosslink to form a product with undesirable physical properties; and if $SiH_b/Vi_a$ ratio is less than 4/1, the product of the process may not have sufficient clustered functional groups to have fast enough cure speed, particularly if a monofunctional reactive species (having one curable group per molecule) is used as ingredient c).

Without wishing to be bound by theory, it is thought that using an excess of silicon bonded hydrogen atoms in ingredient b), relative to aliphatically unsaturated organic groups in ingredient a), may reduce the possibilities of producing high homologs of the clustered functional polyorganosiloxanes, which tend to be insoluble in, and may reduce storage life of, a curable silicone composition containing the clustered functional polyorganosiloxane prepared by the process described herein. The excess of silicon bonded hydrogen atoms in ingredient b) may also result in small (relatively low DP) clustered functional polyorganosiloxanes, which may act as reactive diluents or viscosity modifiers and adhesion promoters. It is difficult to make these highly functional small molecules in an industrial environment because the inhibiting nature of small highly functional silicone hydrides means temperatures above 50° C. are typically required to initiate the hydrosilylation process. This is then followed by a large exotherm, which can be dangerous in the presence of large volumes of solvent, or if careful monitoring of reagents is not used to control the temperature. By simply changing the $SiH_b/Vi_a$ ratio, these species can be made in a dilute solution of clustered functional polyorganosiloxane and filler, thereby significantly reducing gelation and chance of fire due to uncontrolled exothermic reaction.

Ingredient c) Reactive Species

The reactive species may be any species that can provide the curable groups in the clustered functional polyorganosiloxane. The reactive species has an average, per molecule, of at least one aliphatically unsaturated organic group that is capable of undergoing an addition reaction with a silicon bonded hydrogen atom of ingredient b). Ingredient c) further comprises one or more curable groups per molecule. The curable groups are functional (reactive) groups that render the clustered functional polyorganosiloxane (prepared by the process described above) curable. The curable groups on ingredient c) may be selected from acrylate, alcohol, alkoxy, epoxy, isocyanate, methacrylate, urethane, and combinations thereof. Alternatively, the curable groups on ingredient c) may be selected from acrylate, alkoxy, epoxy, methacrylate, and combinations thereof. Where all of the curable groups provided by ingredient c) are the same, the product of the process is deemed a 'single cure' clustered functional polyorganosiloxane. Where two or more different curable groups are provided by ingredient c), e.g., alkoxy and epoxy, the product is deemed a 'multiple cure' clustered functional polyorganosiloxane. Ingredient c) may be one reactive species, or a combination comprising two or more reactive species. When ingredient c) comprises two or more reactive species, the two or more reactive species may have two or more different curable groups. Ingredient c) may comprise a silicon containing species or an organic species. Alternatively, ingredient c) may comprise a silicon containing species, such as a silane.

For example, ingredient c) may comprise a silane of formula (VIII), where formula (VIII) is $R^8{}_o SiR^9{}_{(3-o)}$; in which subscript o has a value ranging from 1 to 3,
each $R^8$ is independently an aliphatically unsaturated organic group, and
each $R^9$ is independently selected from an organic group containing an acrylate group, an alcohol group, an alkoxy group, an epoxy group, an isocyanate group, a methacrylate group, and a urethane group. Alternatively, each $R^8$ may be independently selected from an alkenyl group or an alkynyl group. Suitable alkenyl groups for $R^8$ are exemplified by vinyl, allyl, propenyl, and butenyl. Suitable alkynyl groups for $R^8$ are exemplified by ethynyl and propynyl. Alternatively, each $R^9$ may be independently selected from an acrylate group, an alkoxy group, an epoxy group, and a methacrylate group. Alternatively, ingredient c) may comprise two or more silanes of formula (VII), where formula (VII) is $R^6{}_n SiR^7{}_{(3-n)}$; in which each subscript n independently has a value ranging from 1 to 3,
each $R^6$ is independently an aliphatically unsaturated organic group, and
each $R^7$ is independently selected from an acrylate group, an alcohol group, an alkoxy group, an epoxy group, an isocyanate group, a methacrylate group, and a urethane group.
Alternatively, each $R^6$ may be independently selected from an alkenyl group or an alkynyl group. Alternatively, each $R^7$ may be independently selected from an acrylate group, an alkoxy group, an epoxy group, and a methacrylate group. At least one $R^7$ group on one silane may differ from at least one other $R^7$ group on another silane. Examples of suitable silanes for formulae (VII) and (VIII) include, but are not limited to organo-functional silanes with an alkenyl group, e.g., vinyl, allyl, 1-butenyl, 2-butenyl, 1-isobutenyl, 2-isobutenyl, 1-sec-butenyl, 2-sec-butenyl, 5-hexenyl and are exemplified by allyltrimethoxysilane and 5-hexenyltrimethoxysilane.

Alternatively, ingredient c) may comprise an organic compound (which does not contain a silicon atom). The organic compound for ingredient c) may have an average per molecule of 1 to 2 aliphatically unsaturated organic groups, such as alkenyl or alkynyl groups, and one or more reactive groups selected from an acrylate group, an alkoxy group, an epoxy group, and a methacrylate group. Examples of suitable organic compounds for ingredient c) include, but are not limited to, an allyl alcohol such as 2-allylphenol, 2-allyloxyethanol, 3-allyloxy-1,2-propanediol, or 4-allyl-2-methoxyphenol; a vinyl alcohol; an alkenyl acrylate such as allyl methacrylate (AMA) or vinyl methacrylate; an alkenyl epoxide such as 4-vinylcyclohexane oxide (VCHO), limonene oxide; 7-epoxy-1-octene, or 4-vinyl-1-cyclohexene 1,2-epoxide; an alkenyl trialkoxysilane such as allyltrimethoxysilane (ATMS), allyltriisopropoxysilane, butenyltriethoxysilane, 5-hexenyltriethoxysilane, or 10-undecyltrimethoxysilane; an allyl ether such as allylglycidyl ether (AGE), allyl phenol ether, 1-allylether-2,3-propane diol, trimethylolpropane allyl ether, or allyl vinyl ether; allyl alcohol propoxylate; allyl acetate; allyl acetoacetate; and combinations thereof.

The amount of ingredient c) depends on various factors including the type, amount, and SiH content of ingredient b) and the type of ingredient c) selected. However, the amount of ingredient c) is sufficient to make $SiH_{tot}/Vi_{tot}$ range from 1/1 to 1/1.4, alternatively 1/1.2 to 1.1/1. The ratio $_{SiHtot/Vitot}$ means the molar ratio of total amount of silicon bonded hydrogen atoms on ingredient b) and, if present ingredient g) the chain extender and/or ingredient h) the endcapper (described below), divided by the total amount of aliphatically unsaturated organic groups on ingredients a) and c) combined.

Ingredient d) Hydrosilylation Catalyst

Ingredient d) is a hydrosilylation catalyst which accelerates the reaction of ingredients a), b), and c). Ingredient d) may be added in an amount sufficient to promote the reaction of ingredients a), b), and c), and this amount may be, for example, sufficient to provide 0.1 parts per million (ppm) to 1000 ppm of platinum group metal, alternatively 1 ppm to 500 ppm, alternatively 2 ppm to 200, alternatively 5 ppm to 150 ppm, based on the combined weight of all ingredients used in the process.

Suitable hydrosilylation catalysts are known in the art and commercially available. Ingredient d) may comprise a platinum group metal selected from platinum (Pt), rhodium, ruthenium, palladium, osmium or iridium metal or organometallic compound thereof, or a combination thereof. Ingredient d) is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. These complexes may be microencapsulated in a resin matrix. Alternatively, the catalyst may comprise 1,3-diethenyl-1,1,3,3-tetramethyldisiloxane complex with platinum. When the catalyst is a platinum complex with a low molecular weight organopolysiloxane, the amount of catalyst may range from 0.04% to 0.4% based on the combined weight of the ingredients used in the process.

Suitable hydrosilylation catalysts for ingredient d) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. No. 4,766,176; and U.S. Pat. No. 5,017,654.

Additional Ingredients

The ingredients used in the process described above may optionally further comprise one or more additional ingredients selected from e) a filler, f) a non-reactive resin, g) a chain extender, and h) an endcapper, or a combination thereof. Alternatively, the ingredients used in the process may be ingredients a), b), c) d), and e). Alternatively, the ingredients used in the process may be ingredients a), b), c) d), e) and g). Alternatively, the ingredients used in the process may be ingredients a), b), c) d), e) and h). Alternatively, the ingredients used in the process may be ingredients a), b), c) d), e), g) and h).

Ingredient e) Filler

A filler may be added during the process described above. Fillers are exemplified by reinforcing and/or extending fillers such as, alumina, calcium carbonate (e.g., fumed, ground, and/or precipitated), diatomaceous earth, quartz, silica (e.g., fumed, ground, and/or precipitated), talc, zinc oxide, chopped fiber such as chopped KEVLAR®, or a combination thereof. The amount of filler will depend on various factors including the type of filler selected and the end use of the clustered functional polyorganosiloxane to be produced by the process. However, the amount of filler may be up to 20%, alternatively 1% to 20%, based on the combined weight of all the ingredients. When the clustered functional polyorganosiloxane prepared by the process described above will be used in an adhesive composition, the amount of filler may range from 10% to 20%. Alternatively, when the clustered functional polyorganosiloxane will be used in a sealant composition, the amount of filler may range from 4% to 10%.

Without wishing to be bound by theory, it is thought that when the filler is added during the process described herein, this will provide an improvement in tensile properties as compared to a prior art process in which a conventional 'dumb-bell' type polyorganosiloxane is formed in a multiple step process, and thereafter a filler is dispersed. Therefore, the process described herein may further comprise: mixing ingredient e), a filler, with ingredient a) before or during step 1) of the process described above at paragraph [0014]. Alternatively, the process may further comprise mixing e) a filler with ingredient a) before or during step I) or mixing e) a filler with the ingredients after step I) and before or during step II) of the process described above in paragraph [0015].

The above process step of adding a filler may provide a benefit with many curable groups, however, adverse reactions with clustered functional polyorganosiloxanes (for example, containing hydrolyzable groups) may still be problematic. To combat this problem, the process may further comprise: mixing e) a filler and e') a filler treating agent with ingredient a) before or during step 1) of the process described above at paragraph [0014].

Alternatively, the process may further comprise mixing e) a filler and e') a filler treating agent with ingredient a) before or during step I) or mixing e) a filler and e') a filler treating agent with the ingredients after step I) and before or during step II) of the process described above in paragraph [0017]. The effective treatment of filler surfaces in situ as described above may require elevated temperature and/or vacuum conditions. These conditions may also be undesirable with thermally sensitive unsaturated functional groups and their oxygen enabled antioxidants. Therefore, the filler may be pretreated with the filler treating agent in the presence of ingredient a) at elevated temperature and/or under vacuum. These filler treating conditions may be performed in a batch or continuous process as described, for example, in U.S. Pat. No. 6,013,701 to Kunimatsu, et al.

The resulting combination of treated filler in polyorganosiloxane is referred to as a masterbatch. Masterbatches are commercially available. The use of masterbatches allows the smooth reaction of the aliphatically unsaturated organic groups of ingredient a) with the silicon bonded hydrogen atoms of ingredient b) and unsaturated organic groups of ingredient c) to be performed in a single, low shear step; leading to filled clustered functional polyorganosiloxanes with superior tensile and adhesive properties along with improved rheological and storage properties.

A masterbatch comprising a polyorganosiloxane having aliphatically unsaturated organic groups and a treated filler, with optionally a second polyorganosiloxane (having aliphatically unsaturated organic groups) of the same or differing molecular weight may be combined with ingredients b) and c), and the resulting mixture may be sheared before addition of ingredient d) at room temperature (RT). Reaction may then be initiated by raising the temperature to 50° C. to 100° C. , alternatively 70° C. to 85° C., and maintaining the temperature until all of the SiH has reacted, as measured by the time needed for the SiH peak as observed by Fourier Transform Infra Red spectroscopy (FT-IR) at circa 2170 $cm^{-1}$, to be reduced into the background of the spectra.

Due to the thermal stability of the aliphatically unsaturated polyorganosiloxanes and filler treating agents, these processes can be carried out at higher temperatures and shear, yielding stable, reproducible masterbatches of treated filler (such as silica) in aliphatically unsaturated polyorganosiloxane (polymer) such as vinyl endblocked PDMS. Not wanting to be constrained by theory, it is believed that exposing the polymer/filler interface to high temperature and shear, optimizes polymer/filler interactions and produces stable masterbatches. By using a masterbatch, one skilled in the art can formulate a curable silicone composition at low temperature and shear, which provides the benefit of making the process more widely applicable to prepare curable silicone compositions with different cure chemistries.

The filler treating agent may be a treating agent, which is known in the art. The amount of filler treating agent may vary depending on various factors including the type and amounts of fillers selected for ingredient e) whether the filler is treated with filler treating agent in situ or pretreated before being combined with ingredient a). However, the ingredients may comprise an amount ranging from 0.1% to 2% of filler treating agent, based on the weight of the filler for ingredient e).

The filler treating agent may comprise a silane such as an alkoxysilane, an alkoxy-functional oligosiloxane, a cyclic polyorganosiloxane, a hydroxyl-functional oligosiloxane such as a dimethyl siloxane or methyl phenyl siloxane, a stearate, or a fatty acid. The alkoxysilane may have the formula: $R^{10}_p Si(OR^{11})_{(4-p)}$, where subscript p is 1, 2, or 3; alternatively p is 3. Each $R^{10}$ is independently a monovalent organic group of 1 to 50 carbon atoms, such as a monovalent hydrocarbon group of 1 to 50 carbon atoms, alternatively 6 to 18 carbon atoms. Suitable monovalent hydrocarbon groups for $R^{10}$ are exemplified by alkyl groups such as hexyl, octyl, dodecyl, tetradecyl, hexadecyl, and octadecyl; and aromatic groups such as benzyl, phenyl and phenylethyl. $R^{10}$ can be a monovalent hydrocarbon group that is saturated or unsaturated and branched or unbranched. Alternatively, $R^{10}$ can be a saturated, unbranched, monovalent hydrocarbon group. Each $R^{11}$ may be a saturated hydrocarbon group of 1 to 4 carbon atoms, alternatively 1 to 2 carbon atoms.

Alkoxysilane filler treating agents are exemplified by hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof.

Alkoxy-functional oligosiloxanes can also be used as treatment agents. Alkoxy-functional oligosiloxanes and methods for their preparation are known in the art, see for example, EP 1 101 167 A2. For example, suitable alkoxy-functional oligosiloxanes include those of the formula $(R^{14}O)_q SiR^{12}_2 R^{13})_{(4-q)}$. In this formula, subscript q is 1, 2, or 3, alternatively q is 3. Each $R^{12}$ can be independently selected from saturated and unsaturated monovalent hydrocarbon groups of 1 to 10 carbon atoms. Each $R^{13}$ can be a saturated or unsaturated monovalent hydrocarbon group having at least 11 carbon atoms. Each $R^{14}$ can be an alkyl group.

Alternatively, alkoxysilanes may be used, but typically in combination with silazanes, which catalyze the less reactive alkoxysilane reaction with surface hydroxyls. Such reactions are typically performed above 100° C. with high shear with the removal of volatile by-products such as ammonia, methanol and water.

Alternatively, the filler treating agent can be any of the organosilicon compounds typically used to treat silica fillers. Examples of organosilicon compounds include, but are not limited to, organochlorosilanes such as methyltrichlorosilane, dimethyldichlorosilane, and trimethyl monochlorosilane; organosiloxanes such as hydroxy-endblocked dimethylsiloxane oligomer, hexamethyldisiloxane, and tetramethyldivinyldisiloxane; organosilazanes such as hexamethyldisilazane and hexamethylcyclotrisilazane; and organoalkoxysilanes such as methyltrimethoxysilane, vinyltrimethoxysilane, vinyltriethoxysilane, 3-glycidoxypropyltrimethoxysilane, and 3-methacryloxypropyltrimethoxysilane. Examples of stearates include calcium stearate. Examples of fatty acids include stearic acid, oleic acid, palmitic acid, tallow, coconut oil, and combinations thereof. Examples of filler treating agents and methods for their use are disclosed in, for example, EP 1 101 167 A2 and U.S. Pat. Nos. 5,051,455, 5,053,442, and 6,169,142 (col. 4, line 42 to col. 5, line 2).

Ingredient f) Non-reactive Resin

The non-reactive silicone resin useful herein contains monofunctional units represented by $R^{15}_3SiO_{1/2}$ and tetrafunctional units represented by $SiO_{4/2}$. $R^{15}$ represents a nonfunctional monovalent organic group such as a hydrocarbon group. The silicone resin is soluble in liquid hydrocarbons such as benzene, toluene, xylene, heptane and the like or in liquid organosilicon compounds such as a low viscosity cyclic and linear polydiorganosiloxanes.

In the $R^{15}_3SiO_{1/2}$ unit, $R^{15}$ may be a monovalent hydrocarbon group containing up to 20 carbon atoms, alternatively 1 to 10 carbon atoms. Examples of suitable monovalent hydrocarbon groups for $R^{15}$ include alkyl groups, such as methyl, ethyl, propyl, butyl pentyl, octyl, undecyl and octadecyl; cycloaliphatic radicals, such as cyclohexyl and cyclohexenylethyl; and aryl radicals such as phenyl, tolyl, xylyl, benzyl and 2-phenylethyl. Organic groups for $R^{15}$ are exemplified by the hydrocarbon groups above modified such that where a non-reactive substituent has replaced a hydrogen atom, for example, the nonreactive substituents may include but are not limited to halogen and cyano. Typical organic groups that can be represented by $R^{15}$ include but are not limited to chloromethyl and 3,3,3-trifluoropropyl.

The molar ratio of the $R^{15}_3SiO_{1/2}$ and $SiO_{4/2}$ units in the silicone resin may range from 0.5/1 to 1.5/1, alternatively from 0.6/1 to 0.9/1. These mole ratios are conveniently measured by Silicon 29 Nuclear Magnetic Spectroscopy ($^{29}Si$ NMR). This technique is capable of quantitatively determining the concentration of $R^{15}_3SiO_{1/2}$ ("M") and $SiO_{4/2}$ ("Q") units derived from the silicone resin, in addition to the total hydroxyl content of the silicone resin.

The silicone resin may further comprise 2.0% or less, alternatively 0.7% or less, alternatively 0.3% or less, of terminal units represented by the formula $XSiO_{3/2}$, where X represents hydroxyl or a hydrolyzable group exemplified by alkoxy such as methoxy and ethoxy. The concentration of hydrolyzable groups present in the silicone resin can be determined using FT-IR.

The number average molecular weight, $M_n$, will depend at least in part on the molecular weight of the silicone resin and the type(s) of hydrocarbon groups, represented by $R^{15}$, that are present in this ingredient. $M_n$ as used herein represents the molecular weight measured using gel permeation chromatography (GPC), when the peak representing the neopentamer is excluded form the measurement. The $M_n$ of the silicone resin is typically greater than 3,000, alternatively, $M_n$ may range from 4,500 to 7,500.

The silicone resin can be prepared by any suitable method. Silicone resins of this type have been prepared by cohydrolysis of the corresponding silanes or by silica hydrosol capping methods known in the art. The silicone resin may be prepared by the silica hydrosol capping processes of Daudt, et al., U.S. Pat. No. 2,676,182; of Rivers-Farrell et al., U.S. Pat. No. 4,611,042; and of Butler, U.S. Pat. No. 4,774,310.

The intermediates used to prepare the silicone resin are typically triorganosilanes of the formula $R^{15}_3SiX'$, where X' represents a hydrolyzable group, and either a silane with four hydrolyzable groups such as halogen, alkoxy or hydroxyl, or an alkali metal silicate such as sodium silicate.

It is desirable that the silicon-bonded hydroxyl groups (i.e., $HOR^{15}SiO_{1/2}$ or $HOSiO_{3/2}$ groups) in the silicone resin be below 0.7% based on the total weight of the silicone resin, alternatively below 0.3%. Silicon-bonded hydroxyl groups formed during preparation of the silicone resin may be converted to trihydrocarbylsiloxy groups or a hydrolyzable group by reacting the silicone resin with a silane, disiloxane or disilazane containing the appropriate terminal group. Silanes containing hydrolyzable groups are typically added in excess of the quantity required to react with the silicon-bonded hydroxyl groups of the silicone resin.

Ingredient g) Chain Extender

Ingredient g) is a chain extender. The chain extender may be a polydiorganosiloxane terminated at both ends with hydrogen atoms. An exemplary chain extender may have the formula (XVII): $HR^{16}_2Si-(R^{16}_2SiO)_r-SiR^{16}_2H$, where each $R^{16}$ is independently a monovalent hydrocarbon group exemplified by alkyl such as methyl, ethyl, propyl, butyl, pentyl, and hexyl; and aryl such as phenyl, tolyl, xylyl, and benzyl. Subscript r has an average value ranging from 0 to 400, alternatively 10 to 100.

Whether to use a chain extender, and the amount used when present, depends on various factors including the degree of crosslinking inherent in the system. For example, when starting with a polyorganosiloxane for ingredient a) which has a relatively low average DP, e.g., average DP ranging from 60 to 400, then 50 mole % to 80 mole % of the SiH content in all of the ingredients combined may come from the chain extender, alternatively 70 mole %. When using longer vinyl endblocked polymer (average DP>400) then lower levels are effective, e.g., 25 mole % to 50 mole % of SiH from chain extending molecules, preferably 40 mole %.

Ingredient h) Endcapper

Ingredient h) is an endcapper. The endcapper may be a polydiorganosiloxane having one hydrogen atom per molecule. An exemplary endcapper may have the formula (XVIII), formula (XIX), or a combination thereof. Formula (XVIII) is $R^{17}_3Si-(R^{17}_2SiO)_s-SiR^{17}_2H$. Each $R^{17}$ is independently a monovalent hydrocarbon group exemplified by alkyl such as methyl, ethyl, propyl, butyl, pentyl, and hexyl; and aryl such as phenyl, tolyl, xylyl and benzyl; and subscript s has a value ranging from 0 to 10, alternatively 1 to 10, and alternatively 1. Formula (XIX) is $R^{18}_3Si—(R^{18}_2SiO)_t—(HR^{18}SiO)—SiR^{18}_3$. In this formula, each $R^{18}$ is independently a monovalent hydrocarbon group exemplified by alkyl such as methyl, ethyl, propyl, butyl, pentyl, and hexyl; and aryl such as phenyl, tolyl, xylyl and benzyl. Subscript t has a value ranging from 0 to 10, alternatively 0.

Alternatively, one of a chain extender or an endcapper is used; i.e., in this instance, the chain extender and the endcapper are not in combination with each other.

The endcapper may provide the benefit of producing a looser network of higher tensile properties when used as a mole percentage of the available SiH in the system. The amount of endcapper added may range from 0 to 15%, alternatively 2% to 15%, and alternatively 10%, based on the combined weight of all ingredients used in the process.

A secondary benefit of having a chain extender or an endcapper in the process is initial reduction in viscosity prior to reaction, which may facilitate the reaction and reduce the tendency for gelation due to insufficient mixing and local gel formation. Using a chain extender or an endcapper may be especially beneficial when using relatively high molecular weight polyorganosiloxanes for ingredient a) (e.g., average DP greater than 400) and when a filler is present.

The molar ratio of silicon bonded hydrogen atoms in the ingredients / unsaturated organic groups capable of undergoing hydrosilylation in the ingredients (commonly referred to as $SiH_{tot}/Vi_{tot}$ ratio) may range from 1/1.4 to 1/1, alternatively 1/1.2 to 1/1.1. In this ratio, $SiH_{tot}$ refers to the amount of silicon bonded hydrogen atoms in ingredient b) in combination with the amount of silicon bonded hydrogen atoms in ingredients g) and/or h), if present. $Vi_{tot}$ refers to the total amount of aliphatically unsaturated organic groups in ingredients a) and c) combined.

Ingredient i) Catalyst Inhibitor

Ingredient i) is a catalyst inhibitor. Ingredient i) may optionally be added after step 1) in the method described above in paragraph [0014] or after step II) in the method described above in paragraph [0015] to stop the reaction and stabilize the clustered functional polyorganosiloxane prepared by the process described above. Some examples of suitable catalyst inhibitors include ethylenically or aromatically unsaturated amides, acetylenic compounds such as 2-ethynyl-isopropanol, 2-ethynyl-butane-2-ol, 2-methyl-3-butyn-2-ol, 2-phenyl-3-butyn-2-ol, 3,5-dimethyl-1-hexyn-3-ol, 1-ethynyl-1-cyclohexanol, 1,5-hexadiene, 1,6-heptadiene; 3,5-dimethyl-1-hexen-1-yne; 3-ethyl-3-buten-1-yne or 3-phenyl-3-buten-1-yne; ethylenically unsaturated isocyanates; silylated acetylenic alcohols exemplified by trimethyl (3,5-dimethyl-1-hexyn-3-oxy)silane, dimethyl-bis-(3-methyl-1-butyn-oxy)silane, methylvinylbis(3-methyl-1-butyn-3-oxy)silane, and ((1,1-dimethyl-2-propynyl)oxy)trimethylsilane; unsaturated hydrocarbon diesters; conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne; olefinic siloxanes such as 1,3-divinyltetramethyldisiloxane, 1,3,5,7-tetravinyltetramethyl cyclotetrasiloxane, or 1,3-divinyl-1,3-diphenyldimethyldisiloxane; 1,3,5,7-tetramethyl-1,3,5,7-tetravinylcyclotetrasiloxane; a mixture of a conjugated ene-yne as described above and an olefinic siloxane as described above; hydroperoxides; nitriles and diaziridines; unsaturated carboxylic esters exemplified by diallyl maleate, dimethyl maleate, diethyl fumarate, diallyl fumarate, and bis-2-methoxy-1-methylethylmaleate, mono-octylmaleate, mono-isooctylmaleate, mono-allyl maleate, mono-methyl maleate, mono-ethyl fumarate, mono-allyl fumarate, and 2-methoxy-1-methylethylmaleate; fumarates such as diethylfumarate; fumarate/alcohol mixtures wherein the alcohol is benzyl alcohol or 1-octanol and ethenyl cyclohexyl-1-ol; a nitrogen-containing compound such as tributylamine, tetramethylethylenediamine, benzotriazole; a similar phosphorus-containing compound such as triphenylphosphine; a sulphur-containing compound; a hydroperoxy compound; or a combination thereof.

The inhibitors are used in an amount effective to deactivate ingredient d) the hydrosilylation catalyst. The amount will vary depending on the type and amount of catalyst and the type of inhibitor selected, however, the amount may range from 0.001 to 3 parts by weight, and alternatively from 0.01 to 1 part by weight per 100 parts by weight of ingredient a).

Methods of Use

The process described above produces a clustered functional polyorganosiloxane, or masterbatch of clustered functional polyorganosiloxane and filler and/or non-reactive silicone resin, as the reaction product. Collectively, the clustered functional polyorganosiloxane and the masterbatch of clustered functional polyorganosiloxane and filler and/or non-reactive silicone resin may be referred to herein as a clustered functional product. This clustered functional product is useful for formulation into curable silicone compositions such as adhesives and sealants. The curing mechanism of the curable silicone composition depends on the curable groups imparted to ingredient the clustered functional product by ingredient c) described above, and the other ingredients added to the composition, described below. The curing mechanism may be, for example, a heat curing mechanism such as thermal radical initiation or an organoborane intiation; a radiation curing mechanism such as radiation radical initiation or redox reaction; a room temperature curing mechanism such as condensation reaction or organoborane initiation (when an amine reactive compound is added instead of heat); or a combination thereof.

The curable silicone composition comprises:
(I) a clustered functional product prepared by the process described above, and
(II) a curing agent.

Curing Agent

The selection of curing agent will depend on the type and amount of curable groups (supplied by ingredient c) in ingredient (I). For example, when ingredient (I) has radical curable groups, such as acrylate or methacrylate groups or epoxy groups, the curing agent may comprise a radical initiator.

The radical initiator may be a thermal radical initiator or a radiation radical initiator. Thermal radical initiators include, but are not limited to, dicumyl peroxide, n-butyl 4,4'-bis(butylperoxy)valerate, 1,1-bis(t-butylperoxy)-3,3,5 trimethyl cyclohexane, di-t-butyl peroxide and 2,5-di-(t-butylperoxy)-2,5 dimethyl hexane, 1,1-bis(tert-amylperoxy) cyclohexane (Luperox® 531M80); 2,2-bis(tert-butylperoxy) butane; 2,4-pentanedione peroxide (Luperox® 224), 2,5-bis (tert-butylperoxy)-2,5-dimethylhexane (Luperox® 101), 2,5-di(tert-butylperoxy)-2,5-dimethyl-3-hexyne; 2-butanone peroxide, benzoyl peroxide, cumene hydroperoxide, di-tert-amyl peroxide (Luperox® DTA®), lauroyl peroxide (Luperox® LP), tert-butyl hydroperoxide; tert-butyl peracetate; tert-butyl peroxybenzoate; tert-butylperoxy 2-ethylhexyl carbonate; di(2,4-dichlorobenzoyl) peroxide; dichlorobenzoylperoxide (available as Varox® DCBP from R. T. Vanderbilt Company, Inc. of Norwalk, Connecticut, USA); di(tert-butylperoxyisopropyl)benzene, di(4-methylbenzoyl) peroxide, butyl 4,4-di(tert-butylperoxy)valerate, 3,3,5,7,7-pentamethyl-1,2,4-trioxepane; tert-butyl peroxy-3,5,5-trimethylhexanoate; tert-butyl cumyl peroxide; di(4-tert-butylcyclohexyl) peroxydicarbonate (available as Perkadox 16); dicetyl peroxydicarbonate; dimyristyl peroxydicarbonate; 2,3-dimethyl-2,3-diphenylbutane, dioctanoyl peroxide; tert-butylperoxy 2-ethylhexyl carbonate; tert-amyl peroxy-2-ethylhexanoate, tert-amyl peroxypivalate; and combinations thereof.

Examples of such thermal radical initiators are commercially available under the following trade names: Luperox® sold by Arkema, Inc. of Philadelphia, Pa., U.S.A.; Trigonox and Perkadox sold by Akzo Nobel Polymer Chemicals LLC of Chicago, Ill., U.S.A., VAZO sold by E.I. duPont deNemours and Co. of Wilmington, Del., USA; VAROX® sold by R.T. Vanderbilt Company, Inc. of Norwalk, Conn., U.S.A.; and Norox sold by Syrgis Performance Initiators, Inc. of Helena, Ark., U.S.A. The concentration of the thermal radical initiator may range from 0.01% to 15%, alternatively from 0.1% to 5%, and alternatively 0.1% to 2%, based on the weight of the composition.

Alternatively, the radical initiator may be a radiation photoinitiator, for example, when ingredient (I) has epoxy groups. The radiation photoinitiator may be any conventional photoinitiator for radiation curable silicone compositions known in the art, such as those disclosed in U.S. Pat. No. 4,310,469 to Crivello and U.S. Pat. No. 4,313,988 to Koshar, et al. and European Patent Application No. EP 0 562 922. The photoinitiator may comprise a cationic photoinitiator. The cationic photoinitiator can be any cationic photoinitiator capable of initiating cure (cross-linking) of the clustered functional polyorganosiloxane upon exposure to radiation having a wavelength ranging from 150 to 800 nm. Examples of cationic photoinitiators include, but are not limited to, onium salts.

Suitable onium salts include salts having a formula selected from $R^{19}{}_2I^+MG_u{}^-$, $R^{19}{}_3S^+MG_u{}^-$, $R^{19}{}_3Se^+MG_u{}^-$, $R^{19}{}_4P^+MG_u{}^-$, and $R^{19}{}_4N^+MG_u{}^-$, where each $R^{19}$ is independently a monovalent organic group such as a monovalent hydrocarbon group having from 1 to 30 carbon atoms; M is an element selected from transition metals, rare earth metals, lanthanide metals, metalloids, phosphorus, and sulfur; G is a halogen atom (e.g., Cl, Br, or I), and subscript u has a value such that the product u (charge on G+oxidation number of M)=−1. Examples of substituents on the hydrocarbon group include, but are not limited to, alkoxy groups of 1 to 8 carbon atoms, alkyl groups of 1 to 16 carbon atoms, nitro, chloro, bromo, cyano, carboxyl, mercapto, and heterocyclic aromatic groups, such as pyridyl, thiophenyl, and pyranyl. Examples of metals represented by M include, but are not limited to, transition metals, such as Fe, Ti, Zr, Sc, V, Cr, and Mn; lanthanide metals, such as Pr and Nd; other metals, such as Cs, Sb, Sn, Bi, Al, Ga, and In; metalloids, such as B and As; and P. The formula $MG_u{}^-$ represents a non-basic, non-nucleophilic anion. Examples of anions having the formula $MG_u{}^-$ include, but are not limited to, $BF_4{}^-$, $PF_6{}^-$, $AsF_6{}^-$, $SbF_6{}^=$, $SbCl_6{}^-$, and $SnCl_6{}^-$.

Examples of onium salts include, but are not limited to, bis-diaryliodonium salts such as bis(dodecylphenyl)iodonium salts exemplified by bis(dodecyl phenyl)iodonium hexafluoroarsenate and bis(dodecylphenyl)iodonium hexafluoroantimonate; alkylphenyliodonium salts such as alkylphenyliodonium hexafluoroantimonate; diaryliodonium salts of sulfonic acids, triarylsulfonium salts of sulfonic acids, diaryliodonium salts of boronic acids, and triarylsulfonium salts of boronic acids.

Examples of diaryliodonium salts of sulfonic acids include, but are not limited to, diaryliodonium salts of perfluoroalkylsulfonic acids, such as diaryliodonium salts of perfluorobutanesulfonic acid, diaryliodonium salts of perfluoroethanesulfonic acid, diaryliodonium salts of perfluorooctanesulfonic acid, and diaryliodonium salts of trifluoromethanesulfonic acid; and diaryliodonium salts of aryl sulfonic acids, such as diaryliodonium salts of para-toluenesulfonic acid, diaryliodonium salts of dodecylbenzenesulfonic acid, diaryliodonium salts of benzenesulfonic acid, and diaryliodonium salts of 3-nitrobenzenesulfonic acid.

Examples of triarylsulfonium salts of sulfonic acids include, but are not limited to, triarylsulfonium salts of perfluoroalkylsulfonic acids, such as triarylsulfonium salts of perfluorobutanesulfonic acid, triarylsulfonium salts of perfluoroethanesulfonic acid, triarylsulfonium salts of perfluorooctanesulfonic acid, and triarylsulfonium salts of trifluoromethanesulfonic acid; and triarylsulfonium salts of aryl sulfonic acids, such as triarylsulfonium salts of para-toluenesulfonic acid, triarylsulfonium salts of dodecylbenzenesulfonic acid, triarylsulfonium salts of benzenesulfonic acid, and triarylsulfonium salts of 3-nitrobenzenesulfonic acid.

Examples of diaryliodonium salts of boronic acids include, but are not limited to, diaryliodonium salts of perhaloarylboronic acids. Examples of triarylsulfonium salts of boronic acids include, but are not limited to, triarylsulfonium salts of perhaloarylboronic acid.

The cationic photoinitiator can be a single cationic photoinitiator or a combination comprising two or more different cationic photoinitiators, each as described above. The concentration of the cationic photoinitiator may range from 0.01% to 15%, alternatively 0.1% to 10%, alternatively 0.1% to 5%, and alternatively 0.1% to 2%, based on the weight of the curable silicone composition.

When ingredient (I) has alcohol and/or alkoxy groups, the curing agent may comprise a condensation reaction catalyst. The condensation reaction catalyst may be a Lewis acid; a primary, secondary, or tertiary organic amine; a metal oxide; a titanium compound; a tin compound; a zirconium compound; or a combination thereof. The condensation reaction catalyst may comprise a carboxylic acid salt of a metal ranging from lead to manganese inclusive in the electromotive series of metals. Alternatively, the condensation reaction catalyst may comprise a chelated titanium compound, a titanate such as a tetraalkoxytitanate, a titanium ester, or a combination thereof. Examples of suitable titanium compounds include, but are not limited to, diisopropoxytitanium bis(ethylacetoacetate), tetrabutoxy titanate, tetrabutyltitanate, tetraisopropyltitanate, and bis-(ethoxyacetoacetonate) diisopropoxy titanium (IV), and a combination thereof. Alternatively the condensation reaction catalyst may comprise a tin compound such as dibutyltin diacetate; dibutyltin dilaurate; dibutyl tin oxide; stannous octoate; tin oxide; a titanium ester, such as tetrabutyl titanate, tetraethylhexyl titanate and tetraphenyltitanate; a siloxytitanate, such as tetrakis(trimethylsiloxy)titanium and bis(trimethylsiloxy)-bis(isopropoxy)titanium; and a betadicarbonyltitanium compound, such as bis(acetylacetonyl)diisopropyl titanate; or a combination thereof. Alternatively, the condensation reaction catalyst may comprise an amine, such as hexylamine; or an acetate or quat salt of an amine.

Examples of condensation reaction catalysts are known in the art and are disclosed in U.S. Pat. Nos. 4,962,076; 5,051,455; 5,053,442; 4,753,977 at col. 4, line 35 to col. 5, line 57; and U.S. Pat. No. 4,143,088 at col. 7, line 15 to col. 10, line 35. Condensation reaction catalysts are also commercially available, such as titanium ethyl acetoacetate complex commercially available as DuPontTMTyzor® PITA from E. I. du Pont de Nemours and Company of Wilmington, Del., USA. The amount of the condensation reaction catalyst depends on various factors including the type of catalyst selected and the choice of the remaining ingredients in the composition, however the amount of the condensation reaction catalyst may range from 0.001% to 5% based on the weight of the composition.

Alternatively, the curing agent may comprise an organoborane-amine complex. The organoborane amine complex is a complex formed between an organoborane and a suitable amine compound that renders the complex stable at ambient conditions. The complex should be capable of initiating polymerization or crosslinking of ingredient (I) by the introduction of an amine reactive compound and/or by heating. An example is an alkylborane amine complex formed from trialkylboranes and various amine compounds. While the preferred molar ratio can vary, the optimal molar ratio may range from 1 to 10 nitrogen groups per B atom where B represents boron. Examples of trialkylboranes useful for forming the curing agent include trialkylboranes of the formula B-R"$_3$ where R" represents linear and branched aliphatic or aromatic hydrocarbon groups containing 1 to 20 carbon atoms. Some examples include trimethylborane, tri-n-butylborane, tri-n-octylborane, tri-sec-butylborane, tridodecylborane, and phenyldiethylborane.

Some examples of amine compounds useful to form the organoborane amine complex with the organoborane compounds include 1,3 propane diamine, 1,6-hexanediamine, methoxypropylamine, pyridine, and isophorone diamine. Other examples of amine compounds useful to form organoborane amine complexes are described in US Pat. No. 6,777,512 (the '512 patent), as well as in U.S. Pat. No. 6,806,330.

Silicon containing amine compounds can also be used to form the organoborane amine complex including compositions such as 3-aminopropyltrimethoxysilane, aminomethyltrimethoxysilane, 3-aminopropyltriethoxysilane, aminomethyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxethoxy)silane, N-(2-aminoethyl)-3 -aminopropyltrimethoxysilane, N-(2-aminoethyl)aminomethyltrimethoxysilane, N-(6-aminohexyl)aminomethyltrimethoxysilane,
N-(2-aminoethyl)-11-aminoundecyltrimethoxysilane, (aminoethylaminomethyl)phenethyltrimethoxysilane, N-(2-aminoethyl)-3 -aminopropylmethyldimethoxysilane, N-(2-aminoethyl)-3-aminoisobutylmethyldimethoxysilane, and (3-trimethoxysilylpropyl)diethylene-triamine.

Amine functional polyorganosiloxanes are also useful for forming the organoborane amine complex including amine functional polydiorganosiloxanes, and amine functional polyorganosiloxane resins. This is subject to the stipulation that the molecule contain at least one amine-functional group, such as 3-aminopropyl, 2-aminoethyl, aminomethyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole.

Specific examples include terminal and/or pendant amine-functional polydimethylsiloxane oligomers and polymers, terminal and/or pendant amine-functional random, graft and block copolymers and co-oligomers of polydimethylsiloxane and poly(3,3,3 trifluoropropyl-methylsiloxane), terminal and/or pendant amine-functional random, graft and block copolymers and co-oligomers of polydimethylsiloxane and poly(6,6,6,5,5,4,4,3,3-nonfluorohexyl-methylsiloxane), and terminal and/or pendant amine-functional random, graft and block copolymers and co-oligomers of polydimethylsiloxane and polyphenylmethylsiloxane.

Also useful to form the organoborane amine complex are other nitrogen containing compounds including N-(3-triethyoxysilylpropyl)-4,5-dihydroimidazole, ureidopropyltriethoxysilane, nitrogen containing polyorganosiloxanes, and polyorganosiloxane resins in which at least one group is an imidazole, amidine, or ureido functional group. When the amine compound is polymeric, the molecular weight is not limited, except that it should be such as to maintain a sufficiently high concentration of boron to permit curing or polymerization of the composition. For example, in a two-part composition, the part containing the organoborane initiator may be diluted with other components of the composition, or it may consist of the initiator complex alone.

When an organoborane amine complex is used as the curing agent, the curable silicone composition may further comprise an amine reactive compound that is capable of initiating the polymerization or crosslinking of the composition when mixed with the organoborane amine complex and exposed to an oxygenated environment. The presence of the amine reactive compound allows the initiation of polymerization or crosslinking to occur at temperatures below the dissociation temperature of the organoborane amine complex including room temperature and below. To achieve storage stability in the presence of oxygen, the organoborane amine complex and the amine reactive compound may be physically or chemically isolated. For example, a composition containing an amine reactive compound can be rendered air stable by packaging it separately from the organoborane amine complex as a multiple-part composition. Alternatively, the organoborane amine complex, the amine reactive compound, or both can be encapsulated, or delivered in separate phases. This can be accomplished by introducing one or both of the organoborane amine complex, the amine reactive compound in a solid form that prevents intimate mixing of the organoborane amine complex, the amine reactive compound. Curing of the composition can be activated by (a) heating it above the softening temperature of the solid phase component or encapsulant, or (b) by introduction of a solubilizing agent that allows mixing of the organoborane amine complex, the amine reactive compound. The organoborane amine complex, the amine reactive compound can also be combined in a single container without significant polymerization or crosslinking by packaging the two components in a container where mixing conditions are anaerobic.

Examples of some amine reactive compounds having amine reactive groups that can rapidly initiate polymerization or cure in the presence of oxygen include mineral acids, Lewis acids, carboxylic acids, carboxylic acid derivatives such as anhydrides and succinates, carboxylic acid metal salts, isocyanates, aldehydes, epoxides, acid chlorides, and sulphonyl chlorides. Some suitable amine reactive compounds include acrylic acid, polyacrylic acid, methacrylic acid, polymethacrylic acid, methacrylic anhydride, polymethacrylic anhydride, undecylenic acid, oleic acid, isophorone diisocyanate, methacryloylisocyanate, 2-(methacryloyloxy)ethyl acetoacetate, undecylenic aldehyde, and dodecyl succinic anhydride.

For improved compatibility in curable silicone compositions the amine reactive compound may be an organosilane or organopolysiloxane bearing amine reactive groups. Some examples include 3-isocyanatopropyltrimethoxysilane; isocyanatomethyltrimethoxysilane; 3-glycidoxypropyltrimethoxysilane; triethoxysilylpropyl succinic anhydride; propylsuccinic anhydride functionalized linear, branched, resinous, and hyperbranched organopolysiloxanes; methylsuccinic anhydride functionalized linear, branched, resinous, and hyperbranched organopolysiloxanes; cyclohexenyl anhydride functional linear, resinous, and hyperbranched organopolysiloxanes; carboxylic acid functionalized linear, branched, resinous, and hyperbranched organopolysiloxanes such as carboxydecyl terminated oligomeric or polymeric polydimethylsiloxanes; and aldehyde functionalized linear, branched, resinous, and hyperbranched organopolysiloxanes such as undecylenic aldehyde-terminated oligomeric or polymeric polydimethylsiloxanes. The '512 patent describes silicon containing compounds that can be used including certain compounds that release an acid when exposed to moisture. The '512 patent also describes other amine reactive compounds referred to as decomplexation agents. Alternatively, the decomplexation agent may be selected from acids, anhydrides, isocaynates, or epoxies. Specific examples include 3-(triethoxysilyl)propylsuccinicanhydride, nonenyl succinic anhydride, acetic acid, 2-carboxyethylacrylate, ethylene glycol methacrylate phosphate, and acrylic acid.

Alternatively, the curing agent may comprise a redox reagent as an initiator for radical polymerization. The reagent may be a combination of a peroxide and an amine or a transition metal chelate. The redox reagent is exemplified by, but not limited to, diacyl peroxides such as benzoyl peroxide and acetyl peroxide; hydroperoxides such as cumene hydroperoxide and t-butyl hydroperoxide; ketone peroxides such as methyl ethyl ketone peroxide and cyclohexanone peroxide; dialkyl peroxides such as dicumyl peroxide and ti-t-butyl peroxide; peroxy esters such as t-butyl peroxy acetate; and combinations of thioglycerol and pyrazoles and/or pyrazolones. Alternatively, the redox reagent may be exemplified by dimethylaniline, 3,5-dimethylpyrazole, thioglycerol; and combinations thereof. Examples of suitable redox reagent initiatiors are known in the art and are exemplified as in U.S. Pat. No. 5,459,206. Other suitable peroxides are known in the art and are commercially available such as lauroyl peroxide (Luperox® LP from Arkema), dichlorobenzoylperoxide (Varox® DCBP from R. T. Vanderbilt Company, Inc.) and 6N tert-butyl hydroperoxide.

When ingredient (I) has isocyanate groups or urethane groups, the curing agent may comprise a compound having two or more carbinol groups, such as a polyol, or an amine-functional compound. The curing agent may be an organic compound or a silicone compound with carbinol groups and/or amine functional groups. Examples of suitable curing agents for ingredient (I) with isocyanate and/or urethane groups are exemplified by those disclosed in U.S. Pat. No. 7,452,956 and WO2008/088492 (at paragraphs [0018] to [0037]).

Alternatively, when ingredient (I) has more than one type of curable groups, more than one type of curing agent may be added to the composition. For example, a combination of a radical initiator and a condensation reaction catalyst may be used when ingredient (I) has both radical curable groups and condensation reaction curable groups, such as epoxy and alkoxy groups.

Other Optional Ingredients

The curable silicone composition may optionally further comprise one or more additional ingredients. The additional ingredients are exemplified by (III) a crosslinker, (IV) a solvent, (V) an adhesion promoter, (VI) a colorant, (VII) a reactive diluent, (VIII) a corrosion inhibitor, (IX) a polymerization inhibitor, and a combination thereof. The curable silicone composition may optionally further comprise (X) a filler, (XI) a filler treating agent, (XII) an acidacceptor; and a combination thereof, for example, if a filler has not been added during the process for making the clustered functional polyorganosiloxane, or if more or a different filler is desired to formulate, e.g., the filler to be added is a thermally conductive filler, described below.

Ingredient (III) is a crosslinker. The type and amount of crosslinker will depend on various factors including the type and amount of curable groups on ingredient (I). When the curable silicone composition is condensation reaction curable, the composition may optionally further comprise (III) a crosslinker. The condensation reaction crosslinker may be selected from, for example, trialkoxysilanes exemplified by propyltrimethoxysilane, phenyltrimethoxysilane, glycidoxypropyltrimethoxysilane, ethyltrimethoxysilane, aminopropyltrimethoxysilane, aminoethylaminopropyltrimethoxysilane, methyltrimethoxysilane, phenyl trimethoxysilane, and methyltriethoxysilane; acetoxysilanes such as methyltriacetoxysilane or ethyltriacetoxysilane; ketoximosilanes such as methyltri(methylethylketoximo)silane, tetra(methylethylketoximo)silane, methyltris(methylethylketoximo)silane, and vinyltris(methylethylketoximo) silane; alkyl orthosilicates such as tetraethyl orthosilicate, tetramethoxysilane, tetraethoxysilane, and condensation products of these orthosilicates, which are typically referred to as alkyl polysilicates; methylvinyl bis(n-methylacetamido) silane; and a combination thereof.

Ingredient (IV) is a solvent. Suitable solvents are exemplified by organic solvents such as toluene, xylene, acetone, methylethylketone, methyl isobutyl ketone, hexane, heptane, alcohols such as decyl alcohol or undecyl alcohol, and a combination thereof; and non-crosslinkable silicone solvents such as trimethylsiloxy-terminated polydimethylsiloxanes, trimethylsiloxy-terminated polymethylphenylsiloxanes, and a combination thereof. Examples of silicone solvents are known in the art and are commercially available, for example, as DOW CORNING® OS Fluids from Dow Coming Corporation of Midland, Mich., U.S.A. The amount of ingredient (IV) may range from 0.001% to 90% based on the weight of the curable silicone composition.

Ingredient (V) is an adhesion promoter. Examples of suitable adhesion promoters include an alkoxysilane such as an epoxy-functional alkoxysilane, or a mercapto-functional compound; a combination of an alkoxysilane and a hydroxy-functional polyorganosiloxane; a mercapto-functional compound; an unsaturated compound; an epoxy-functional silane; an epoxy-functional siloxane; a combination, such as a reaction product, of an epoxy-functional silane or epoxy-functional siloxane and a hydroxy-functional polyorganosiloxane; or a combination thereof. Suitable adhesion promoters are known in the art and are commercially available. For example, Silquest® A186 is beta-(3,4-epoxycyclohexyl)ethyltrimethoxysilane which is commercially available from Crompton OSi Specialties of Middlebury, Connecticut, USA. CD9050 is a monofunctional acid ester useful as an adhesion promoter that provides adhesion to metal substrates and is designed for radiation curable compositions. CD9050 is commercially available from Sartomer Co. SR489D is tridecyl acrylate, SR395 is isodecyl acrylate, SR257 is stearyl acrylate, SR506 is isobornyl acrylate, SR833S is tricyclodecane dimethanol diacrylate, SR238 is 1,6 hexanediol diacrylate, and SR351 is trimethylol propane triacrylate, all of which are also commercially available from Sartomer Co. The amount of adhesion promoter added to the composition depends on various factors including the specific adhesion promoter selected, the other ingredients of the composition, and the end use of the composition, however, the amount may range from 0.1% to 5% based on the weight of the composition. Other suitable adhesion promoters, which are useful to promote adhesion to metals, include maleic anhydride, methacrylic anhydride, and glycicyl methacrylate.

Ingredient (V) can be an unsaturated or epoxy-functional compound. Suitable epoxy-functional compounds are known in the art and commercially available, see for example, U.S. Pat. Nos. 4,087,585; 5,194,649; 5,248,715; and 5,744,507 (at col. 4-5). Ingredient (g) may comprise an unsaturated or epoxy-functional alkoxysilane. For example, the functional alkoxysilane can have the formula $R^{20}_v Si(OR^{21})_{(4-v)}$, where subscript v is 1, 2, or 3, alternatively v is 1.

Each $R^{20}$ is independently a monovalent organic group with the proviso that at least one $R^{20}$ is an unsaturated organic group or an epoxy-functional organic group. Epoxy-functional organic groups for $R^{20}$ are exemplified by 3-glycidoxypropyl and (epoxycyclohexyl)ethyl. Unsaturated organic groups for $R^{20}$ are exemplified by 3-methacryloyloxypropyl, 3-acryloyloxypropyl, and unsaturated monovalent hydrocarbon groups such as vinyl, allyl, hexenyl, undecylenyl.

Each $R^{21}$ is independently an unsubstituted, saturated hydrocarbon group of 1 to 4 carbon atoms, alternatively 1 to 2 carbon atoms. $R^{21}$ is exemplified by methyl, ethyl, propyl, and butyl.

Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof. Alternatively, examples of suitable adhesion promoters include glycidoxypropyltrimethoxysilane and a combination of glycidoxypropyltrimethoxysilane with an aluminum chelate or zirconium chelate.

Ingredient (V) may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. Ingredient (V) may comprise a combination of an epoxy-functional alkoxysilane and an epoxy-functional siloxane. For example, ingredient (V) is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer. When used as a physical blend rather than as a reaction product, these components may be stored separately in multiple-part kits.

Suitable mercapto-functional compounds include an organomercaptan, a mercapto containing silane, or a combination thereof. Suitable mercapto containing silanes include 3-mercaptopropyltrimethoxysilane. Suitable mercapto-functional compounds are disclosed in U.S. Pat. No. 4,962,076. One skilled in the art would recognize that certain ingredients described herein may be added to the composition for more than one or different purposes.

For example, alkoxysilanes may be use as adhesion promoters, filler treating agents, and/or as crosslinking agents in condensation reaction curable silicone compositions.

Ingredient (VI) is a colorant (e.g., dye or pigment). Examples of suitable colorants include carbon black and Stan-Tone 50SP01 Green (which is commercially available from PolyOne). Examples of colorants are known in the art and are disclosed in U.S. Pat. Nos. 4,962,076; 5,051,455; and 5,053,442. The amount of colorant added to the curable silicone composition depends on various factors including the other ingredients of the composition, and the type of colorant selected, however, the amount may range from 0.001% to 20% based on the weight of the composition.

Ingredient (VII) is a reactive diluent. Ingredient (VII) may be diluent that reacts with a functional group on ingredient (I). The reactive diluent may be a monofunctional reactive diluent, a difunctional reactive diluent, a polyfunctional reactive diluent, or a combination thereof. The reactive diluent selected will depend on various factors including the curable groups on ingredient (I). However, examples of suitable reactive diluents include an acrylate, an alcohol, an anhydride such as a maleic anhydride or methacrylic anhydride, an epoxy such as a monofunctional epoxy compound, a methacrylate such as glycicyl methacrylate, an oxetane, a vinyl acetate, a vinyl ester, a vinyl ether, a fluoro alkyl vinyl ether, a vinyl pyrrolidone such as N-vinyl pyrrolidone, a styrene, or a combination thereof.

Mono-functional acrylate and methacrylate esters are commercially available from companies such as Sartomer, Rohm Haas, Hitachi Chemical, Arkema, Inc., Cytec, Sans Ester Corp, Rahn, and Bomar Specialties Co. Specific examples include methyl acrylate; methyl methacrylate; ethyl acrylate; ethyl methacrylate; butyl acrylate; butyl methacrylate; cyclohexyl acrylate; hexyl acrylate; 2-ethylhexyl acrylate; isodecyl methacrylate; isobornyl methacrylate; hydroxyethyl methacrylate; hydroxypropyl acrylate; hydroxypropyl methacrylate; n-octyl acrylate; cyclohexyl methacrylate; hexyl methacrylate; 2-ethylhexyl methacrylate; decyl methacrylate; dodecyl methacrylate; lauryl acrylate; tert-butyl methacrylate; acrylamide; N-methyl acrylamide; diacetone acrylamide; N-tert-butyl acrylamide; N-tert-octyl acrylamide; N-butoxyacrylamide; gamma-methacryloxypropyl trimethoxysilane; dicyclopentadienyloxyethyl methacrylate; 2-cyanoethyl acrylate; 3-cyanopropyl acrylate; tetrahydrofurfuryl methacrylate; tetrahydrofurfuryl acrylate; glycidyl acrylate; acrylic acid; methacrylic acid; itaconic acid; glycidyl methacrylate; 1,12 dodecanediol dimethacrylate; 1,3-butylene glycol diacrylate; 1,3-butylene glycol dimethacrylate; 1,3-butylene glycol dimethacrylate; 1,4-butanediol diacrylate; 1,4-butanediol dimethacrylate; 1,4-butanediol dimethacrylate; 1,6 hexanediol diacrylate; 1,6 hexanediol dimethacrylate; alkoxylated cyclohexane dimethanol diacrylate; alkoxylated hexanediol diacrylate; alkoxylated neopentyl glycol diacrylate; cyclohexane dimethanol diacrylate; cyclohexane dimethanol dimethacrylate; diethylene glycol diacrylate; diethylene glycol dimethacrylate; dipropylene glycol diacrylate; ethoxylated bisphenol a diacrylate; ethoxylated bisphenol a dimethacrylate; ethylene glycol dimethacrylate; neopentyl glycol diacrylate; neopentyl glycol dimethacrylate; polypropylene glycoldimethacrylate; propoxylated neopentyl glycol diacrylate; propoxylated neopentyl glycol diacrylate; tricyclodecane dimethanol diacrylate; triethylene glycol diacrylate; trimethylolpropane triacrylate;

trimethylolpropane trimethacrylate; tris (2-hydroxy ethyl) isocyanurate triacrylate; tris (2-hydroxy ethyl) isocyanurate triacrylate; n,n'-m-phenylenedimaleimide; triallyl cyanurate; triallyl isocyanurate; metallic diacrylate; metallic dimethacrylate; metallic monomethacrylate; metallic diacrylate (difunctional); metallic dimethacrylate (difunctional); triethoxysilylpropyl methacrylate; tributoxysilylpropyl methacrylate; dimethoxymethylsilylpropyl methacrylate;

diethoxymethylsilylpropyl methacrylate; dibutoxymethylsilylpropyl methacrylate; diisopropoxymethylsilylpropyl methacrylate; dimethoxysilylpropyl methacrylate; diethoxysilylpropyl methacrylate; dibutoxysilylpropyl methacrylate; diisopropoxysilylpropyl methacrylate; trimethoxysilylpropyl acrylate; triethoxysilylpropyl acrylate; tributoxysilylpropyl acrylate; dimethoxymethylsilylpropyl acrylate; diethoxymethylsilylpropyl acrylate; dibutoxymethylsilylpropyl acrylate; diisopropoxymethylsilylpropyl acrylate; dimethoxysilylpropyl acrylate; diethoxysilylpropyl acrylate; dibutoxysilylpropyl acrylate; and diisopropoxysilylpropyl acrylate.

Examples of suitable alcohols include ethanol, butanol, hexanol, decanol, undecyl alcohol, and combinations thereof. Examples of suitable epoxy compounds include glycidyl ethers such as butyl glycidyl ether, cresyl glycidyl ether, aliphatic glycidyl ether, 2-ethylhexyl glycidyl ether, and glycidyl ether of cyclohexane dimethanol; and difunctional reactive diluents based on neopentyl glycol and diglycidyl ether of 1,4-butanediol. These epoxy compounds are known in the art and commercially available from Air Products and Chemicals, Inc. of Allentown, Pa., U.S.A. under the tradenames EPODIL® 741, 742, 746, 747, 748, 749, 750, 751, 757, and 759. Other epoxy compounds suitable as reactive diluents are available from Hexion Specialty Chemicals, Inc. of Houston, Tex., U.S.A. under the tradename Heloxy Modifiers 7,8, 61, and 116. Examples of suitable vinyl ethers include, but are not limited to butanediol divinyl ether, cyclohexanedimethanol divinyl ether, cyclohexanedimethanol monovinyl ether, cyclohexyl vinyl ether, diethyleneglycol divinyl ether, diethyleneglycol monovinyl ether, dodecyl vinyl ether, ethyl vinyl ether, hydroxybutyl vinyl ether, isobutyl vinyl ether, isopropyl vinyl ether, n-butyl vinyl ether, n-propyl vinyl ether, octadecyl vinyl ether, triethyleneglycol divinyl ether, and combinations thereof. Vinyl ethers are known in the art and commercially available from BASF AG of Germany, Europe. The amount of ingredient (VII) depends on various factors such as the specific reactive diluent selected, but the amount may range from 0.5 to 50% based on the weight of curable silicone composition. One skilled in the art would recognize that some of the reactive diluents described herein (such as the difunctional and polyfunctional acrylates and methacrylates) may also be used in addition to, or instead of, the reactive species described above as ingredient c).

Ingredient (VIII) is a corrosion inhibitor. Examples of suitable corrosion inhibitors include benzotriazole, mercaptabenzotriazole, mercaptobenzothiazole, and commercially available corrosion inhibitors such as 2,5-dimercapto-1,3,4-thiadiazole derivative (CUVAN®) 826) and alkylthiadiazole (CUVAN® 484) from R. T. Vanderbilt. The amount of ingredient (VIII) may range from 0.05% to 0.5% based on the weight of the curable silicone composition.

Ingredient (IX) is a polymerization inhibitor. Examples of suitable polymerization inhibitors for acrylate and methacrylate curable groups include, but are not limited to: hydroquinone (HQ); 4-methoxyphenol (MEHQ); 4-ethoxyphenol; 4-propoxyphenol; 4-butoxyphenol; 4-heptoxyphenol; butylated hydroxytoluene (BHT); hydroquinone monobenzylether; 1,2-dihydroxybenzene; 2-methoxyphenol; 2,5-dichlorohydroquinone; 2,5-di-tert-butylhydroquinone; 2-acetylhydroquinone; hydroquinone monobenzoate; 1,4-dimercaptobenzene; 1,2-dimercaptobenzene; 2,3,5-trimethylhydroquinone; 4-aminophenol;

2-aminophenol; 2-N, N-dimethylaminophenol; 2-mercaptophenol; 4-mercaptophenol; catechol monobutylether; 4-ethylaminophenol; 2,3-dihydroxyacetophenone; pyrogallol-1,2-dimethylether; 2-methylthiophenol; t-butyl catechol; di-tert-butylnitroxide; di-tert-amylnitroxide; 2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-amino-2,2,6,6-tetramethyl-piperidinyloxy; 4-ethanoloxy-2,2,6,6-tetramethyl-piperidinyloxy; 2,2,5,5-tetramethyl-pyrrolidinyloxy; 3-amino-2,2,5,5-tetramethyl-pyrrolidinyloxy; 2,2,5,5-tetramethyl-1-oxa-3-azacyclopentyl-3-oxy; 2,2,5,5-tetramethyl-3-pyrrolinyl-1-oxy-3-carboxylic acid; 2,2,3,3,5,5,6,6-octamethyl-1,4-diazacyclohexyl-1,4-dioxy; salts of 4-nitrosophenolate; 2-nitrosophenol; 4-nitrosophenol; copper dimethyldithiocarbamate; copper diethyldithiocarbamate; copper dibutyldithiocarbamate; copper salicylate; methylene blue; iron; phenothiazine (PTZ); 3-oxophenothiazine; 5-oxophenothiazine; phenothiazine dimer; 1,4-benzenediamine; N-(1,4-dimethylpentyl)-N'-phenyl-1,4-benzenediamine; N-(1,3-dimethylbutyl)-N=-phenyl-1,4-benzenediamine; N-nitrosophenylhydroxylamine and salts thereof; nitric oxide; nitrobenzene;

p-benzoquinone; or isomers thereof; combinations of two or more thereof; or combinations of one or more of the above with molecular oxygen. When present, the polymerization inhibitor may be added to the curable silicone composition in an amount ranging from 100 ppm to 4,000 ppm. Polymerization inhibitors are known in the art and are disclosed, for example in EP 1 359 137.

Ingredient (X) is a filler that may be added if a filler was not used in the process for making the clustered functional polyorganosiloxane, or if additional filler or a different type of filler is desired, such as a thermally conductive filler. The filler may be a filler described above as ingredient e). Alternatively, the filler may be a thermally conductive filler.

The thermally conductive filler may be both thermally conductive and electrically conductive. Alternatively, the thermally conductive filler may be thermally conductive and electrically insulating. The thermally conductive filler may be selected from the group consisting of aluminum nitride, aluminum oxide, aluminum trihydrate, barium titanate, beryllium oxide, boron nitride, carbon fibers, diamond, graphite, magnesium hydroxide, magnesium oxide, metal particulate, onyx, silicon carbide, tungsten carbide, zinc oxide, and a combination thereof. The thermally conductive filler may comprise a metallic filler, an inorganic filler, a meltable filler, or a combination thereof. Metallic fillers include particles of metals and particles of metals having layers on the surfaces of the particles. These layers may be, for example, metal nitride layers or metal oxide layers on the surfaces of the particles. Suitable metallic fillers are exemplified by particles of metals selected from the group consisting of aluminum, copper, gold, nickel, silver, and combinations thereof, and alternatively aluminum. Suitable metallic fillers are further exemplified by particles of the metals listed above having layers on their surfaces selected from the group consisting of aluminum nitride, aluminum oxide, copper oxide, nickel oxide, silver oxide, and combinations thereof. For example, the metallic filler may comprise aluminum particles having aluminum oxide layers on their surfaces.

Inorganic fillers are exemplified by onyx; aluminum trihydrate, metal oxides such as aluminum oxide, beryllium oxide, magnesium oxide, and zinc oxide; nitrides such as aluminum nitride and boron nitride; carbides such as silicon carbide and tungsten carbide; and combinations thereof. Alternatively, inorganic fillers are exemplified by aluminum oxide, zinc oxide, and combinations thereof. Meltable fillers may comprise Bi, Ga, In, Sn, or an alloy thereof. The meltable filler may optionally further comprise Ag, Au, Cd, Cu, Pb, Sb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point ranging from 50° C. to 250° C., alternatively 150° C. to 225° C. The meltable filler may be a eutectic alloy, a non-eutectic alloy, or a pure metal. Meltable fillers are commercially available.

For example, meltable fillers may be obtained from Indium Corporation of America, Utica, N.Y., U.S.A.; Arconium, Providence, R.I., U.S.A.; and AIM Solder, Cranston, R.I., U.S.A. Aluminum fillers are commercially available, for example, from Toyal America, Inc. of Naperville, Ill., U.S.A. and Valimet Inc., of Stockton, Calif., U.S.A. Silver filler is commercially available from Metalor Technologies U.S.A. Corp. of Attleboro, Mass., U.S.A.

Thermally conductive fillers are known in the art and commercially available, see for example, U.S. Pat. No. 6,169,142 (col. 4, lines 7-33). For example, CB-A20S and Al-43-Me are aluminum oxide fillers of differing particle sizes commercially available from Showa-Denko, and AA-04, AA-2, and AA18 are aluminum oxide fillers commercially available from Sumitomo Chemical Company Zinc oxides, such as zinc oxides having trademarks KADOX® and XX®, are commercially available from Zinc Corporation of America of Monaca, Pa., U.S.A.

The shape of the thermally conductive filler particles is not specifically restricted, however, rounded or spherical particles may prevent viscosity increase to an undesirable level upon high loading of the thermally conductive filler in the composition.

The thermally conductive filler may be a single thermally conductive filler or a combination of two or more thermally conductive fillers that differ in at least one property such as particle shape, average particle size, particle size distribution, and type of filler. For example, it may be desirable to use a combination of inorganic fillers, such as a first aluminum oxide having a larger average particle size and a second aluminum oxide having a smaller average particle size. Alternatively, it may be desirable, for example, use a combination of an aluminum oxide having a larger average particle size with a zinc oxide having a smaller average particle size. Alternatively, it may be desirable to use combinations of metallic fillers, such as a first aluminum having a larger average particle size and a second aluminum having a smaller average particle size. Alternatively, it may be desirable to use combinations of metallic and inorganic fillers, such as a combination of aluminum and aluminum oxide fillers; a combination of aluminum and zinc oxide fillers; or a combination of aluminum, aluminum oxide, and zinc oxide fillers. Use of a first filler having a larger average particle size and a second filler having a smaller average particle size than the first filler may improve packing efficiency, may reduce viscosity, and may enhance heat transfer.

The average particle size of the thermally conductive filler will depend on various factors including the type of thermally conductive filler selected and the exact amount added to the curable silicone composition, as well as the bondline thickness of the device in which the cured product of the composition will be used when the cured product will be used as a thermal interface material (TIM). However, the thermally conductive filler may have an average particle size ranging from 0.1 micrometer to 80 micrometers, alternatively 0.1 micrometer to 50 micrometers, and alternatively 0.1 micrometer to 10 micrometers.

The amount of the thermally conductive filler in the composition depends on various factors including the cure mechanism selected for the curable silicone composition and the specific thermally conductive filler selected. However, the amount of the thermally conductive filler may range from 30 vol % to 80 vol %, alternatively 50 vol % to 75 vol % by volume of the composition. Without wishing to be bound by theory, it is thought that when the amount of filler is greater than 80 vol %, the composition may crosslink to form a cured silicone with insufficient dimensional integrity for some applications, and when the amount of filler is less than 30%, the cured silicone prepared from the composition may have insufficient thermal conductivity for TIM applications.

Ingredient (XI) is a filler treating agent. The filler treating agent may be a filler treating agent described above as the filler treating agent for ingredient e). Alternatively, metal fillers can be treated with alkylthiols such as octadecyl mercaptan and others, and fatty acids such as oleic acid, stearic acid, titanates, titanate coupling agents, zirconate coupling agents, and a combination thereof.

Treatment agents for alumina or passivated aluminum nitride may include alkoxysilyl functional alkylmethyl polysiloxanes (e.g., partial hydrolysis condensate of $R^{22}_w R^{23}_x Si(OR^{24})_{(4-w-x)}$ or cohydrolysis condensates or mixtures), or similar materials where the hydrolyzable group may comprise silazane, acyloxy or oximo. In all of these, a group tethered to Si, such as $R^{22}$ in the formula above, is a long chain unsaturated monovalent hydrocarbon or monovalent aromatic-functional hydrocarbon. Each $R^{23}$ is independently a monovalent hydrocarbon group, and each $R^{24}$ is independently a monovalent hydrocarbon group of 1 to 4 carbon atoms. In the formula above, subscript w is 1, 2, or 3 and subscript x is 0, 1, or 2, with the proviso that the sum (w+x) is 1, 2, or 3. One skilled in the art would recognize that the alkoxysilanes and mercapto-functional compounds described as adhesion promoters for ingredient (V) may alternatively be used, in addition to or instead of, filler treating agents for ingredient (XI). One skilled in the art could optimize a specific treatment to aid dispersion of the filler without undue experimentation.

Ingredient (XII) is an acidacceptor. The acid acceptor may comprise a metal oxide such as magnesium oxide. Acid acceptors are known in the art and are commercially available under tradenames including Rhenofit F, Star Mag CX-50, Star Mag CX-150, BLP-3, and MaxOx98LR. Rhenofit F was calcium oxide from Rhein Chemie Corporation of Chardon, Ohio, USA. Star Mag CX-50 was magnesium oxide from Merrand International Corp. of Portsmouth, N.H., USA. MagOX 98LR was magnesium oxide from Premier Chemicals LLC of W. Conshohocken, Pa., USA. BLP-3 was calcium carbonate was Omya Americas of Cincinnati, Ohio, USA.

The curable silicone composition described herein includes:

(I) a clustered functional product described above, and (II) a curing agent. The composition may optionally further comprise one or more ingredients selected from: (III) a crosslinker, (IV) a solvent, (V) an adhesion promoter, (VI) a colorant, (VII) a reactive diluent, (VIII) a corrosion inhibitor, (IX) a polymerization inhibitor, (XII) an acid acceptor (used for thermal radical initiators that generate acid by products), and a combination thereof. Various cure mechanisms can be selected by one of ordinary skill in the art based on the selection of ingredient c) used to make the clustered functional polyorganosiloxane. For example, the composition may be condensation reaction curable, where ingredient (II) is a condensation reaction catalyst, and the composition optionally further comprises (III) a crosslinker selected from a trialkoxysilane, an acetoxysilane, a ketoximosilane, an alkyl orthosilicate, an alkyl polysilicate, methylvinyl bis(n-methylacetamido) silane; and a combination thereof. Alternatively, the composition may be radiation curable, where ingredient (II) comprises a radical initiator. This radiation curable composition may have the radical produced by radiation, thermal, organoborane, or redox reaction. Alternatively, the composition may be one in which ingredient (I) has alkoxy groups and ingredient (I) has acrylate groups, methacrylate groups, or a combination thereof.

Alternatively, the composition may be a multiple cure composition, where ingredient (I) has more than one type of curable groups. An exemplary multiple cure composition is on in which ingredient (I) has both condensation reaction curable groups and radical curable groups. Alternatively, the multiple cure composition may be one in which ingredient (I) has epoxy and alkoxy groups.

Alternatively, a filled curable silicone composition may comprise:

(I) a clustered functional polyorganosiloxane prepared by the process described above in paragraph [0014] without filler, (II) a curing agent, and (X) a filler. The filler may comprise a thermally conductive filler. The filled curable silicone composition may further comprise one or more ingredients selected from (III) a crosslinker, (IV) a solvent, (V) an adhesion promoter, (VI) a colorant, (VII) a reactive diluent, (VIII) a corrosion inhibitor, (IX) a polymerization inhibitor, (XI) a filler treating agent, (XII) an acid acceptor and a combination thereof.

One skilled in the art would be able to select appropriate curing agents and additional ingredients to formulate compositions for sealants and adhesives based on the description above and the examples provided herein.

The curable silicone composition described above may be used in various applications, for example, sealant applications such as forming a lid seal (e.g., automotive lid seal or microelectronics lid seal), forming an adhesive (such as a die attach adhesive or thermally conductive adhesives), or forming a terminal sealant.

The curable silicone composition described above, and a cured silicone prepared by curing the composition, are useful in electronics applications, including both microelectronics and macroelectronics applications as well as optoelectronics applications and thermally conductive electronics applications, such as making thermally conductive adhesives. Cured silicone adhesives prepared from such a curable silicone composition may adhere to various electronics substrates, including metals such as aluminum, copper, and electroless nickel; as well as polymeric substrates such as FR4, Nylon, polycarbonate, Lucite (which is polymethylmethacrylate, PMMA), polybutylene terephthalate (PBT), and Solvay liquid crystal polymers.

EXAMPLES

These examples are intended to illustrate the invention to one of ordinary skill in the art and should not be interpreted as limiting the scope of the invention set forth in the claims. The following ingredients were used in the examples described below.

Polymer a1) was dimethylvinylsiloxy-terminated polydimethylsiloxane having a viscosity of 190 mm$^2$/s.

Polymer a2) was dimethylvinylsiloxy-terminated polydimethylsiloxane having a viscosity of 450 mPa·s.

Polymer a3) was dimethylvinylsiloxy-terminated polydimethylsiloxane having a viscosity of 2,000 mPa·s.

Polymer a4) was dimethylvinylsiloxy-terminated polydimethylsiloxane having a viscosity of 9,000 mm$^2$/s.

Polymer a5) was dimethylvinylsiloxy-terminated polydimethylsiloxane having a viscosity of 55,000 mm$^2$/s.

Polymer a6) was phenylmethylvinylsiloxy-terminated poly(dimethyl/phenylmethyl siloxane) having viscosity of 22,000 mm$^2$/s.

Chain Extender g) was hydrogen-terminated, dimethylsiloxane having viscosity of 13 mm$^2$/s and SiH content of 1,500 ppm (chain extender).

SIH b2) was a mixture of 5% hexamethylcyclohexasiloxane, 43% pentamethylcyclopentasiloxane, and 52% tetramethylcyclotetrasiloxane, the mixture having a viscosity of 1 mm$^2$/s and an SiH content of 16,667 ppm.

Endcapper h) was heptamethyltrisiloxane (endcapper).

SIH b4) was 1,1,5,5-tetramethyl-3-(n-propyl)-3-(dimethoxysilyloxy)trisiloxane.

SIH b5) was tetrakis(dimethylsiloxy)silane from Gelest.

Inhibitor i) DAM was diallyl maleate.

d) Pt catalyst was 1,3-diethenyl-1,1,3,3-tetramethyldisiloxane complexes with platinum.

c1) ATMS was allyltrimethoxysilane.

c2) AMA was allylmethacrylate.

c3) VCHO was vinyl cyclohexane oxide.

PAG was (3-methylphenyl)((C12-13 branched)phenyl)iodonium hexafluoroantimonate catalyst available as Dow Corning 2-7129 catalyst from Dow Corning Corporation.

c4) AGE was allyl glycidyl ether.

Luperox® P was tert-butyl peroxybenzoate from Arkema.

Luperox® LP was lauroyl peroxide from Arkema.

Varox® DCBP was dichlorobenzoylperoxide from R. T. Vanderbilt Company, Inc.

Perkadox 16 was di(4-tert-butylcyclohexyl) peroxydicarbonate from Akzo Nobel.

SR297 was 1,3-butyleneglycoldimethacrylate from Sartomer Co.

SR239 was 1,6-hexanediol dimethacrylate from Sartomer Co.

CD9050 was a monofunctional acid ester useful as an adhesion promoter that provides exceptional adhesion to metal substrates and is designed for radiation curable compositions. CD9050 is commercially available from Sartomer Co.

SR489D was tridecyl acrylate, which is commercially available from Sartomer Co.

SR395 was isodecyl acrylate, which is commercially available from Sartomer Co.

SR257 was stearyl acrylate, which is commercially available from Sartomer Co.

SR506 was isobornyl acrylate, which is commercially available from Sartomer Co.

SR833S was tricyclodecane dimethanol diacrylate, which is commercially available from Sartomer Co.

SR238 was 1,6 hexanediol diacrylate, which is commercially available from Sartomer Co.

SR351 was trimethylol propane triacrylate, which is commercially available from Sartomer Co.

SR203 was tetrahydrofurfuryl methacrylate, which is commercially available from Sartomer Co.

Perkadox 16 in SR297 was a mixture of equal weights of Perkadox 16 and SR297.

TBT was a reactive alkoxide transesterification catalyst commercially available as DuPontTMTyzor® TnBT from E. I. du Pont de Nemours and Company of Wilmington, Del., USA.

PITA titanium ethyl acetoacetate complex commercially available as DuPontTMTyzor® PITA from E. I. du Pont de Nemours and Company of Wilmington, Del., USA.

e') HMDZ was hexamethyldisilazane from Aldrich.

MEHQ was 4-methoxyphenol from Aldrich.

PTZ was phenothiazine from Aldrich.

Darocur 1173 was 2-hydroxy-2-methyl-1-phenyl-propan-1-one from Ciba.

Dowex® 2040 was an ion exchange resin from the Dow Chemical Company of Midland Mich., having product number Z2306.

IBTMS was isobutyltrimethoxysilane.

e1) Evonik R8200 was fumed silica treated with hexamethyldisilazane, which is commercially available as AEROSIL® R 8200 from Evonik Degussa Corporation of Nanping, Fujian, China.

e2) TS530 was hexamethyldisilazane treated fumed silica commercially available as Cabosil® TS-530 from Cabot Specialty Chemicals, Inc. of Billerica, Mass., USA.

PDMS represents polydimethylsiloxane.

UVA 1500 was a cycloaliphatic epoxy monomer used in radiation/UV curable compositions.

Z6040 was glycidoxypropyltrimethoxysilane.

Zr(acac)4 was zirconium acetylacetonate.

Silquest® A186 was beta-(3,4-epoxycyclohexyl)ethyltrimethoxysilane which is commercially available from Crompton OSi Specialties of Middlebury, Connecticut, USA.

MgO was magnesium oxide. MgO was added as an acid acceptor used to neutralize acid by-products from the decomposition of peroxides.

Reference Example 1

Gel Permeation Chromatography (GPC)

GPC data was collected using a Waters 515 pump, a Waters 717 autosampler, and a Waters 2410 differential refractometer. The separation was made with two (300 mm×7.5 mm) Polymer Laboratories Plgel 5 micrometer (um) Mixed-C columns, preceded by a Plgel 5 um guard column HPLC grade toluene eluent was used at 1.0 milliliter per minute (mL/min) flowrate, and the columns and detector were heated to 45° C. An injection volume of 50 microliters (uL) was used and the sample prefiltered through a 0.45 um polytetrafluoroethylene (PTFE) syringe filter. Molecular weight averages were determined relative to a calibration curve (4$^{th}$ order) created using polydimethylsiloxane (PDMS) standards covering the molecular weight range of 1,300-850,000.

Reference Example 2

$^{29}$SiNMR $^{29}$Si NMR data was collected on a Varian Mercury 300 using chloroform D solvent.

The experiment was conducted with a relaxation delay of 60 seconds (sec) with a gated decoupled pulse sequence using a 5 millimeter (mm) switchable PFG probe. Alternatively, the sample was run on a Mercury 400 using a Nalorac 16 mm silicon free Pulsetune® probe with 0.03 M chromium di(acetylacetonate), as a relaxation reagent and gated decoupling to ensure quantitative conditions. Both used 90 degree pulsewidth and the 400 used a 12 sec relaxation delay.

Comparative Examples

Endblocked methacrylate polymers can be made by preparation of a silicone hydride functional siloxane followed by hydrosilylation with c2) AMA in a separate step. (This differs from the process claimed herein, in which the preparation of the silicone hydride functional siloxane and hydrosilylation with c2) AMA are performed concurrently, or without an intervening purification step.)

Comparative Example 1

Preparation of Polymers

Chain Extender, cyclic polydimethylsiloxane (PDMS cyclics) and Dowex® 2040 ion exchange resin as catalyst were added to a 3 neck round bottom flask fitted with a condenser, mechanical stirrer and thermocouple. A molar excess of PDMS cyclics (compared to the Chain Extender) was added. The resulting mixture was heated under nitrogen with stirring at 100° C. for 4 hours. The resulting polymer was cooled and filtered to remove the catalyst. The polymer was then stripped of excess PDMS cyclics at 150° C. and 1 mm Hg using a wiped film evaporator (WFE). Five linear silicone hydride endblocked polymers with degree of polymerization (DP) ranging from 100 to 1420 were obtained by changing the Chain Extender to PDMS cyclic ratio. The resulting silicone hydride endblocked polymers were analyzed by GPC and $^{29}$Si NMR.

The silicone hydride endblocked polymers prepared above were combined with c2) AMA at a SiH/Vi ratio of 1.3 in a 3 neck round bottom flask fitted with a condenser, mechanical stirrer, and thermocouple. These polymers were catalyzed with 1 part per million (ppm) Pt catalyst and heated at 80° C. in the presence of 100 ppm of MEHQ. The hydrosilylation of the SiH groups was monitored by the disappearance of the SiH peak in the infrared (IR) spectrum at 2173 cm$^{-1}$.

The resulting c2) AMA endblocked PDMS polymers were stripped by WFE at 70° C. and 1 mmHg The resulting polymers were designated Polymers 7-11 in Table 1. Polymers 7-11 were each combined with filler and radical initiator in the amounts shown in Table 1.

TABLE 1

| Ingredient | Weight parts | Weight parts | Weight parts | Weight parts | Weight parts | Weight parts |
|---|---|---|---|---|---|---|
| Polymer 7 | 81 | 0 | 0 | 0 | 0 | 0 |
| Polymer 8 | 0 | 81 | 0 | 0 | 0 | 0 |
| Polymer 9 | 0 | 0 | 81 | 0 | 0 | 0 |
| Polymer 10 | 0 | 0 | 0 | 81 | 0 | 0 |
| Polymer 11 | 0 | 0 | 0 | 0 | 81 | 0 |
| Clustered functional polyorganosiloxane of Example 7 | 0 | 0 | 0 | 0 | 0 | 81 |
| Cabosil TS530 | 15 | 15 | 15 | 15 | 15 | 15 |
| VAROX ® DCBP | 4 | 4 | 4 | 4 | 4 | 4 |

TABLE 2

| | Results | | | | |
|---|---|---|---|---|---|
| | Degree of | avg. peak | avg. peak | MDR results 90° C. | |
| Sample Made with Polymer # | polymerization | stress $lb_f/in^2$ | strain % | S'Max lb-in | TC90 Min:sec |
| Polymer 7 | 100 | 229 | 63 | 11.85 | 12.56 |
| Polymer 8 | 188 | 304 | 113 | 11.49 | 19.07 |
| Polymer 9 | 336 | 396 | 184 | 10.67 | 18.25 |
| Polymer 10 | 434 | 296 | 177 | 7.53 | 17.37 |
| Polymer 11 | 1420 | 330 | 694 | 0.81 | 12.32 |
| Clustered functional polyorganosiloxane of example 7 | 700 | 409 | 185 | 10.38 | 12.04 |

The samples in Table 1 were cured at 90° C. on a Monsanto Die Rheometer (MDR) to determine their rate of cure, and relative hardness. See Table 2 for a comparison of linear materials made in a 2 part synthesis for comparative purposes (Polymers 7-11), and composition made using the clustered functional polyorganosiloxane made in a single step process described below in Example 7.

EXAMPLES

The process for making examples generally involved pre-mixing for 20 minutes the vinyl endblocked polymer (a1, a2, a3, a4, a5, or a6, described above), polyorganohydrogensiloxane (SIH b2, SIH b4, or SIH b5), and unsaturated reactive species (c1, c2, c3, or c4) at RT. A Pt hydrosilylation catalyst was then added at RT and stirred for a further 20 minutes. The reaction was initiated by ramping the temperature to 80° C. The extent of the reaction was followed by monitoring the disappearance of the SiH peak circa 2170 cm$^{-1}$ in the FT-IR. The reaction was typically complete within 1 hour, at which time the product was cooled to 50° C. and DAM was added.

Example 1

In a 1 liter glass resin kettle fitted with a condenser, mechanical stirrer, and thermocouple the following ingredients were added: 428.34 parts (pts) of Polymer a4, 7.65 pts of SIH b2, 14.01 pts of c2) AMA, and 0.05 pts of PTZ. The resulting mixture was stirred at room temperature (RT) for 10 minutes until the mixture was homogeneous. After this, 0.09 pts of Pt catalyst were added, and the mixture was stirred room temperature for 20 minutes. The reaction was initiated by increasing the mixer temperature to 80° C. The reaction was monitored by measuring the reduction of the SiH peak at 2173 cm$^{-1}$ in the Fourier Transform Infra-Red (FT-IR). Typical reaction times were 1 hour. The reaction temperature was then cooled to 50° C. and 0.9 pts of DAM were added with mixing, and the resulting mixture was cooled to room temperature. The resultant clustered functional polyorganosiloxane had a Brookfield cone and plate viscosity at 5 rpm of 15300 cps. The tensile properties of 40 mil thick samples cured at 125° C. for 15 minutes on an MDR were reported in Table 3 for the composition made with the clustered functional polyorganosiloxane prepared in this example 1.

TABLE 3

| | Results | |
|---|---|---|
| | w/out filler | w/filler |
| MDR results | | |
| S'Max lb-in | 7.78 | 13.15 |
| TC90 Min:sec | 4.09 | 2.48 |
| TS 1 Min:sec | 0.45 | 0.32 |
| Tensile properties | | |
| avg. peak stress $lb_f/in^2$ | 37 | 152 |
| avg. peak strain % | 7.6 | 75 |

Example 2

In a 10 liter Turrello mixer, 6515 pts of Polymer a2), 401 pts of SIH b2), 900 pts of c1) ATMS, and 0.89 pts of MEHQ were combined. The combination was stirred at RT for 10 minutes until the mixture was homogeneous. After this, 1.05 pts of Pt catalyst were added, and the mixture was stirred at room temperature for 20 minutes. The reaction was initiated by increasing the mixer temperature to 100° C. The reaction was monitored by measuring the reduction of the SiH peak at 2173 cm$^{-1}$ in the FT-IR. The reaction temperature was then cooled to 50° C., and 8.9 pts of DAM were added with mixing, and then the mixture was cooled to RT. In a dental cup, 95 pts of the resulting moisture curing clustered functional polyorganosiloxane was mixed with 3 pts of IBTMS and 2 parts of PITA titanate catalyst. The resulting product had a thin film tack free time of 2 minutes.

Example 3

In a 3 liter glass resin kettle fitted with a condenser, mechanical stirrer, and thermocouple, the following ingredients were combined: 1369.1 pts of Polymer a6), 48.7 pts of SIH b2), 82.2 pts of c3) VCHO, and 0.05 pts of PTZ. The combination was stirred at RT for 10 minutes until the resulting mixture was homogeneous. After this, 0.3 pts of Pt catalyst were added, and the mixture was stirred at room temperature for 20 minutes. The reaction was initiated by increasing the mixer temperature to 80° C. The reaction was monitored by measuring the reduction of the SiH peak at 2173 cm$^{-1}$ in the FT-IR. The reaction temperature was then cooled to 50° C., and 0.9 pts of DAM were added with mixing. The resulting epoxy functional clustered functional polyorganosiloxane was cooled to room temperature. The clustered functional polyorganosiloxane prepared by example 3 was combined with the ingredients in Table 3, and tensile properties were evaluated as described above after curing for 15 minutes at 80° C. The ingredients and amounts, and the results are in Table 4.

TABLE 4

| Ingredient | Pts |
|---|---|
| Clustered Functional Polyorganosiloxane prepared in Example 3 | 77 |
| TS530 | 15 |
| UVA 1500 | 5 |
| Decyl alcohol | 1 |
| DC2-7129 PAG | 1 |
| Perkadox 16 | 1 |
| Tensile Properties | |
| avg. peak stress $lb^f/in_2$ | 447.1 |
| avg. peak strain % | 50.3 |

Examples 4-6 (Chain Extension)

In a 1 liter glass resin kettle fitted with a condenser, mechanical stirrer, and thermocouple, examples 4-6 were prepared as outlined above. The ingredients and amounts in each example for chain extension are shown in Table 5.

TABLE 5

| | Example 4 | Example 5 | Example 6 |
|---|---|---|---|
| Polymer a4 | 422.79 | 422.79 | 422.79 |
| SIH b2 | 2.45 | 4.9 | 7.35 |
| Chain Extender | 73.5 | 49 | 24.5 |
| c2) AMA | 17.78 | 17.78 | 17.78 |
| PTZ | 0.05 | 0.05 | 0.05 |
| Pt Catalyst | 0.08 | 0.08 | 0.08 |
| DAM | 1.1 | 1.1 | 1.1 |
| Mol % CE | 75 | 50 | 25 |

Viscosities and MDR Resultswere measured and reported in Table 6.

TABLE 6

| Brookfield Cone plate viscosities/cps | | | |
|---|---|---|---|
| | Example 4 | Example 5 | Example 6 |
| 0.5 rpm | 9440 | 9440 | 12600 |
| 1 rpm | 5500 | 6290 | 8640 |
| 5 rpm | 3620 | 3940 | 5980 |
| 10 rpm | 3540 | 3780 | 5820 |
| MDR Results | | | |
| S'Max lb-in | 5.28 | 6.21 | 7.28 |
| TC90 Min:sec | 3.45 | 3.31 | 3.23 |
| TS 1 Min:sec | 1.15 | 1.01 | 0.53 |

Examples 4-6 were formulated into compositions in dental cups. The sample compositions contained the ingredients in Table 7.

TABLE 7

| | Weight Pts | Weight Pts | Weight Pts |
|---|---|---|---|
| Clustered Functional Polyorganosiloxane of Ex. 4 | 84 | 0 | 0 |
| Clustered Functional Polyorganosiloxane of Ex. 5 | 0 | 84 | 0 |
| Clustered Functional Polyorganosiloxane of Ex. 6 | 0 | 0 | 84 |
| TS530 | 10 | 10 | 10 |
| Luperox P | 6 | 6 | 6 |

The filled and catalyzed compositions prepared in examples 4-6 were cured at 125° C. for 15 minutes in a MDR. The results are in Table 6, above.

Example 7

Chain Extended Clustered Functional Polyorganosiloxane

In a 1 liter glass resin kettle fitted with a condenser, mechanical stirrer, and thermocouple, the following ingredients were combined: 549.6 pts of Polymer a4), 7.6 pts of SIH b2), 58 pts of Chain Extender, 23.1 pts of c2) AMA, and 0.06 pts of MEHQ. The combination was stirred at room temperature for 10 minutes until the mixture was homogeneous. After this, 0.11 pt of Pt catalyst was added, and the mixture was stirred at room temperature for 20 minutes. The reaction was initiated by increasing the mixer temperature to 80° C. The reaction was monitored by measuring the reduction of the SiH peak at 2173 cm$^{-1}$ in the FT-IR. The reaction temperature was then cooled to 50° C., and 1.2 pts of DAM were added with mixing. The resulting methacrylate clustered functional polyorganosiloxane was then cooled to room temperature. This polyorganosiloxane had a Brookfield cone and plate viscosity at 1 rpm of 27800 cps. The methacrylate clustered functional polyorganosiloxane (of Example 7) was formulated in a composition with the ingredients in Table 8, and the resulting composition was cured at 80° C. for 15 minutes and then analyzed by MDR.

TABLE 8

| Ingredient | Pts |
|---|---|
| Clustered Functional Polyorganosiloxane of Example 7 | 83 |
| Cabosil T%530 | 15 |
| Perkadox 16 | 2 |
| 80° C. MDR Results | |
| S'Max | 27.43 |
| TC90 | 5.43 |
| Scorch Time | 0.34 |

Examples 8 & 9 (Chain Termination with Endcapper)

In a 1 liter glass resin kettle fitted with a condenser, mechanical stirrer, and thermocouple, examples 8 and 9 were prepared as outlined above, except the ingredients and the amounts in Table 8 were used. Composition samples were cured at 125° C. for 15 minutes and evaluated by MDR as described above, and the results are in Table 9.

TABLE 9

| Ingredients for making Endcapped Clustered Functional Polyorganosiloxane | 15% Chain Termination Example 8 | 5% Chain Termination Example 9 |
|---|---|---|
| Polymer a2) | 384.93 pts | 384.93 pts |
| SIH b2) | 20.1 pts | 22.5 pts |
| Endcapper | 13.1 pts | 4.4 pts |
| c2) AMA | 41.37 pts | 41.37 pts |
| PTZ | 0.05 pt | 0.05 pt |
| Pt. | 0.08 pt | 0.08 pts |
| Brookfield Cone plate viscosity Cps | | |
| 5 rpm | 472 | 628 |
| Ingredients in Composition | | |
| Clustered Functional Polyorganosiloxane of Ex. 8 | 94 pts | 0 |
| Clustered Functional Polyorganosiloxane of Ex. 9 | 0 | 94 pts |
| Luperox P | 6 pts | 6 pts |
| MDR results 125° C. | | |
| S'Max lb-in | 14.43 | 16.81 |
| TC90 Min:sec | 2.51 | 2.3 |
| TS 1 Min:sec | 0.28 | 0.25 |

Example 10

In a 10 liter Turrello mixer equipped with a scrapper blade and two disperser blades, 5632 pts of Polymer a4), 125.7 pts of SIH b2), 30.49 pts of c1) ATMS, 213.4 pts of c2) AMA, and 1.2 pts of MEHQ were added and mixed for 10 minutes at room temperature.

After this, 1.15 pts of Pt catalyst were added, and the mixture was stirred at room temperature for 20 minutes. The reaction was initiated by increasing the mixer temperature to 80° C. After 1 hour of mixing at 80° C., the reactor was cooled to 50° C., and 6.7 pts of DAM were added with mixing. In this example, the resulting clustered functional polyorganosiloxane contained available reactive groups, 90 mole % of which were methacrylate based while 10 mole % were moisture curable groups. The resulting clustered functional polyorganosiloxane was a multi-cure clustered functional polyorganosiloxane.

Examples 11-13

Using a 1 quart Ross mixer and PTZ as a radical inhibitor and Polymer a2) and Polymer a4), SIH b2) methylhydrogen cyclics, and c2) AMA were pre-mixed at RT for 10 minutes. The Pt catalyst was added, and RT mixing continued for a further 20 minutes. The reaction was initiated by increasing the mixer temperature to 80° C. After 1 hour of mixing at 80° C., the mixer was cooled to 50° C., and 6.7 pts of DAM were added with mixing.

The clustered functional polyorganosiloxanes prepared were formulated into compositions containing the ingredients in Table 10. The compositions in Table 10 were mixed in a dental cup with 20% TS530 filler and 4% Varox® DCBP. After cure for 15 minutes at 150° C., the samples were subjected to tensile testing. The ingredients and their amounts (pts), and the tensile testing results are in Table 10.

TABLE 10

| | Example 11 | Example 12 | Example 13 |
|---|---|---|---|
| PTZ | 0.07 | 0.07 | 0.07 |
| Polymer a2) | 144.8 | 275.4 | 393.7 |
| Polymer a4) | 434.4 | 275.4 | 131.2 |
| SIH b2) | 24.5 | 34.4 | 43.4 |
| c2) AMA | 47 | 64.9 | 81.8 |
| Pt | 0.12 | 0.12 | 0.12 |
| DAM | 0.7 | 0.7 | 0.7 |
| Example 11 | 76 | 0 | 0 |
| Example 12 | 0 | 76 | 0 |
| Example 13 | 0 | 0 | 76 |
| TS530 | 20 | 20 | 20 |
| Varox ® DCBP | 4 | 4 | 4 |
| Tensile testing after cure at 150° C. for 15 minutes | | | |
| avg. peak stress $lb_f/in^2$ | 397 | 591 | 320 |
| avg. peak strain % | 229 | 77 | 55 |

Example 14 (Filler Dispersed)

In a 10 liter Turrello mixer equipped with a scrapper blade and two disperser blades, 5000 pts of the clustered functional polyorganosiloxane (polymer) made in example 7 was added. In 200 gram (g) increments, 1470 g of TS530 was added with low shear mixing.

Higher shear was applied to the resulting 20% masterbatch for 20 minutes.

Example 15 (Filler Reaction)

In a 10 liter Turrello mixer equipped with a scrapper blade and two disperser blades, 5160 pts of Polymer a4, and 1039 g of TS530 were added to prepare a polymer base. The TS530 (treated filler) was added in approximately 100g increments over a 75 minute period.

To this polymer base, 69.1 pts of SIH b2, 546.8 pts of , 217 pts of c2) AMA, and 0.1 pt of MEHQ were added and mixed for 10 minutes. The resulting filled mixture was cooled to 25° C. before adding 1.05 pts of Pt catalyst and stirring at RT for 20 minutes. The reaction was initiated by increasing the mixer temperature to 80° C. After 1 hour of mixing at 80° C., the mixer was cooled to 50° C. and 10.98 pts of DAM were added with mixing.

The masterbatches prepared in examples 11 and 12 were formulated with 4% Varox® DCBP and adjusted as shown in table 11 to give adhesives with 14.4% filler for direct comparison. The compositions were cured at 125° C. for 15 minutes and analyzed for tensile properties and by MDR. The ingredients of the compositions and their amounts, as well as the results of tensile and MDR testing are in Table 10. The clustered functional polyorganosiloxane from example 7 was used to cut back the clustered functional polyorganosiloxane prepared in example 14, so it was at the same filler level as example 15 in order to make a fair comparison of physical properties. The polymer from example 14 has 20% filler in order to make what is called a thick phase polymer—filler masterbatch. The thick phase gives the best dispersion of the filler, by getting the shear into the polymer/filler system, however, it also causes new surface of the filler to be produced.

TABLE 11

| Ingredients | pts | Pts |
|---|---|---|
| Clustered Functional Polyorganosiloxane from Example 7 | 25 | 0 |
| Clustered Functional Polyorganosiloxane from Example 14 | 75 | 0 |

TABLE 11-continued

|  | pts | Pts |
|---|---|---|
| Ckystered Functional Polyoranosiloxane from Example 15 | 0 | 100 |
| Varox ® DCBP | 4 | 4 |
| Tensile Properties 125° C. cure 15 mins | | |
| avg. peak stress lb$_f$/in$^2$ | 331.3 | 574.9 |
| avg. peak strain % | 175.3 | 109.4 |
| MDR results 125° C. | | |
| S'Max lb-in | 10.23 | 27.46 |
| TC90 Min:sec | 1.14 | 3.12 |
| TS 1 Min:sec | 0.27 | 0.33 |

Creating the reactive network in the presence of a treated filler created a base with improved tensile properties over those derived from simply dispersing the same filler in a pre-reacted polymer network.

While not wanting to be constrained by theory, it is widely believed in the rubber and sealant industry that high shear present when a thick phase polyorganosiloxane—filler masterbatch is prepared leads to breaking of filler aggregations and more intimate polyorganosiloxane—filler interactions. It is these interactions that are responsible for the improved tensile and mechanical properties of such systems. During such high shear events, a treating agent may optionally be introduced to functionalize filler surface to prevent excessive interactions as this leads very high viscosity masterbatches, and in extreme cases crumbly, unusable masterbatches. In example 16, nominally treated filler (TS 530) was dispersed in the clustered functional polyorganosiloxane from example 7 in the presence of treating agents. This process treats any new surface created in the present high shear thick phase process, thereby increasing stability of the resulting base and improving its adhesion. It is believed that residue surface hydroxyl groups sequester silane adhesion promoters during formulating and shelf aging, leaving less or no adhesion promoter available for improved adhesion in when the composition is applied to a substrate.

Example 16 (in situ treated Filler)

In a 10 liter Turrello mixer equipped with a scrapper blade and two disperser blades, 2667 pts of the clustered functional polyorganosiloxane prepared in example 7 was added. In 5 approximately equal addition steps, 1333 g of TS530 was added, along with 137 g of 3-(trimethoxysilyl)propyl methacrylate, and 1.2 g of hexamethyldisilazane. This high shear thick phase material was heated to 80° C. for 2 hours with 25 mmHg vacuum. The clustered functional polyorganosiloxane prepared in example 7 was added to cut this back to give a masterbatch containing 24.7% filler.

Clustered functional polyorganosiloxanes prepared in examples 14-16 were then formulated into compositions containing 14.4% filler and 4% Varox® DCBP using the clustered functional polyorganosiloxane prepared in example 7 at adjusted filler levels. The materials were cured between Clad Aluminum 1×3 inch panels with a 1 inch overlap and 40 mil bond line. Samples were cured at 125° C. for 15 minutes, then lap shear adhesion was measured. Similar samples were aged at 85° C./85% relative humidity (RH) to accelerate adhesion losses. The results of lap shear adhesion testing are in Table 12.

TABLE 12

|  | lap shear initial | lap shear 8 days 85° C./85% RH |
|---|---|---|
| Example 14 | Cohesive | Adhesive |
| Example 15 | Cohesive | Adhesive |
| Example 16 | Cohesive | Cohesive |

Examples 1-16 produce clustered functional polyorganosiloxanes, and compositions containing them, that can be used as sealants and adhesives in numerous application areas.

Example 17 (90 mol % c2) AMA 10 Mol c1) ATMS in situ Treated Filler)

In a 1 quart Ross mixer, the following ingredients were added: 0.1 g of MEHQ, 393 g of Polymer a4), and 441 g of a HMDZ treated filler masterbatch in Polymer a5). The HMDZ treated filler was Cab-o-Sil MS-75 fumed silica. The ingredients were mixed for 10 minutes. After this, 15.9 g of SIH b2, 40.5 g of c2) AMA, and 4.87 g of c1) ATMS were added, and the resulting combination was mixed for 10 minutes at RT. Next, 0.2 g of Pt catalyst were added, and the resulting combination was mixed a further 20 minutes at RT. The reaction was initiated by heating the mixer to 80° C., and this temperature was maintained for 1 hour. The resulting product was cooled to 50° C., and 1.5 g of DAM was added.

Example 17 was a masterbatch of filler and a dual cure clustered functional polyorganosiloxane having approximately 90 mole percent of its reactive functionality being radically cured through methacrylate groups, and 10 mole percent of its reactive functionality being alkoxy moisture curing groups.

Table 13 shows the ingredients in a composition containing the example 17 masterbatch fully formulated and cured at 80° C. for 15 minutes. The formulation was tested for both tensile properties and lap shear on Clad Al 1×3 inch panels with a 1 inch overlap and 40 mil bond line. The initial thermal cure was followed by accelerated or RT moisture cure over 1 and 7 days respectively.

TABLE 13

| Ingredient | Pts |
|---|---|
| Example 17 polyorganosiloxane - filler masterbatch | 91 |
| SR297 | 2 |
| Perkadox 16 | 2 |
| PITA | 2 |
| IBTMS | 1 |
| z6040 | 2 |
| Zr(acac)4 | 0.1 |

Initial tensile properties after thermal cure at 80° C. for 15 minutes were 223 lb$_f$/in$^2$ for the peak stress, and 396% for elongation. After aging thermally cured samples under 85% RH/85° C., the same properties increased to 422 lb$_f$/in$^2$ and 438% elongation. Similar evidence of secondary moisture cure was observed with similar thermal cured samples aged at 50% RH and 25° C., yielding 413 lb$_f$/in$^2$ and 447% elongation.

Examples 18-20

In a 10 liter Turrello mixer equipped with a scrapper blade and two disperser blades, 6046 pts of Polymer a4, 136.4 pts of SIH b2, 257 pts of c2) AMA, 85 pts of c1) ATMS and 0.8 pts of MEHQ were added and mixed for 10 minutes. After this, 1.2 pts of Pt catalyst was added with stirring at room temperature for 20 minutes. The reaction was initiated by increasing the mixer temperature to 80° C. After 1 hour of mixing at 80° C., the reactor was cooled to 50° C., and 11.5 pts of DAM were added with mixing.

The clustered functional polyorganosiloxane prepared in example 18 had 80 mole percent of its reactive functionality as methacrylate and 20 mole percent as alkoxy. This polyorganosiloxane was mixed in a dental cup with 4% of Varox® DCBP, and 15% of a treated filler, either Cabosil TS530 or Evonik's R8200. Examples 19-20 were compositions that contained the clustered functional polyorganosiloxane prepared in example 18 and were prepared by mixing the ingredients shown in Table 14. Examples 19-20 have comparable filler levels. The ingredients and amounts in the compositions, as well as the tensile properties, lap shear data, and viscosities are shown in Table 14. All samples were cured at 80° C. for 30 minutes, and lap shear samples were tested on clad Al 1×3 inch panels with a 1 inch overlap and 40 mil bond line.

Example 21

In a 10 liter Turrello mixer equipped with a scrapper blade and two disperser blades 0.6 g of MEHQ was added to 6201 g of a masterbatch containing HMDZ treated filler in Polymer a4), 107 g of SIH b2, 201.4 g of c2) AMA, and 83.5 g of c1) ATMS. The HMDZ treated filler was Cab-o-Sil MS-75 fumed silica. These ingredients were mixed for 10 minutes at RT. After this, 1.0 g of Pt catalyst was added, and the combination was mixed a further 20 minutes at RT. The reaction was initiated by heating the mixer to 80° C. and maintaining for 1 hour. After this, the mixer was cooled to 50° C., and 13.8 g of DAM was added. The ingredients and amounts in the compositions, as well as the tensile properties, lap shear data, and viscosities are shown in Table 14. All samples were cured at 80° C. for 30 minutes, and lap shear samples were tested on clad Al substrates, as described above.

TABLE 14

| | Example 19 | Example 20 | Example 21 |
|---|---|---|---|
| Clustered Functional Polyorganosiloxane prepared in Example 18 | 81 | 81 | 0 |
| Masterbatch prepared in Example 21 | 0 | 0 | 96 |
| TS530 | 15 | 0 | 0 |
| Evonik R8200 | 0 | 15 | 0 |
| Varox ® DCBP | 4 | 4 | 4 |
| Tensile Properties 80° C./30 min | | | |
| avg. peak stress $lb_f/in^2$ | 394 | 355 | 453 |
| avg. peak strain % | 305 | 252 | 212 |
| Lap Shear Data Al Clad 80° C./30 min | | | |
| avg. peak stress $lb_f/in^2$ | 114 | 110 | 126 |
| avg. peak strain % | 17 | 17 | 16 |
| Brookfield Viscosity/cps 25° C. | | | |
| 0.5 rpm | 1,060,000 | 407,300 | 781,600 |

Example 22

In a 1 quart Ross mixer 0.1 g of MEHQ was added to 459 g of a masterbatch containing HMDZ treated filler in Polymer a5), and 223 g of Polymer a4). The HMDZ treated filler was Cab-o-Sil MS-75 fumed silica. The ingredients were mixed for 10 minutes. To this mixer, 23.5 g of SIH b2), 47 g of c2) AMA, and 15.1 g of c1) ATMS were added and mixed for 10 minutes at RT. After this, 0.1g of Pt catalyst was added and mixed a further 20 minutes at RT. The reaction was initiated by heating the mixer to 80° C. and maintaining for 1 hour. The resulting product was cooled to 50° C., and 3.3 g of DAM was added.

Example 23 (Comparative)

In a 1 quart Ross mixer 0.1 g of MEHQ was added to 707 g of a HMDZ treated filler masterbatch in Polymer a4), 67.5 g of SIH b)4, 75 g of c2) AMA, and 24 g of c1) ATMS. The HMDZ treated filler was Cab-o-Sil MS-75 fumed silica. The ingredients were mixed 10 minutes at RT. After this, 0.2 g of Pt catalyst were added and mixed a further 20 minutes at RT. The reaction was initiated by heating the mixer to 80° C. and maintaining for 1 hour.

The resulting product was cooled to 50° C., and 3.3 g of DAM was added.

Example 24

In a 1 quart Ross mixer 0.1 g of MEHQ was added to 437g of a HMDZ treated filler masterbatch in Polymer a4), 67.5 g of SIH b5), 47 g of c2) AMA, and 15 g of c1) ATMS. The HMDZ treated filler was Cab-o-Sil MS-75 fumed silica. The ingredients were mixed for 10 minutes at RT. After this, 0.2 g of Pt catalyst were added and mixed a further 20 minutes at RT. The reaction was initiated by heating the mixer to 80° C. and maintaining for 1 hour. The resulting product was cooled to 50° C., and 2 g of DAM was added.

The products prepared in examples 21-24 were formulated into compositions with Varox® DCBP. The ingredients and amounts are in Table 15. The lap shear data and tensile properties are in Table 16.

TABLE 15

| Ingredient | Pts | Pts | Pts | Pts |
|---|---|---|---|---|
| Example 21 | 96 | 0 | 0 | 0 |
| Example 22 | 0 | 96 | 0 | 0 |
| Example 23 | 0 | 0 | 96 | 0 |
| Example 24 | 0 | 0 | 0 | 96 |
| Varox ® DCBP | 4 | 4 | 4 | 4 |

TABLE 16

| Example | 21 | 22 | 23 | 24 |
|---|---|---|---|---|
| Lap Shear Data Al Clad 80° C./30 min | cohesive | cohesive | No Cure | cohesive |
| avg. peak stress $lb_f/in^2$ | 126 | 133 | 0 | 119 |
| avg. peak strain % | 16 | 17 | 0 | 26 |
| Tensile Properties 80° C./30 min | Ex. 21 | Ex. 22 | Ex. 23 | Ex. 24 |
| avg. peak stress $lb_f/in^2$ | 453 | 656 | 0 | 418 |
| Example | 21 | 22 | 23 | 24 |
| avg. peak strain % | 212 | 455 | 0 | 570 |

Examples 22 and 23 illustrate the ability of the process to carry out the coupling of alternative multifunctional silicone hydride species to vinyl endcapped polymers and monomeric allyl and vinyl species to produce filled materials with single or multiple cure mechanisms. The linear polyorganohydrogensiloxane used in example 23 does not have sufficient reactive functionality clusters to cure sufficiently in the time for this example under the low temperature conditions used in this experiment due to the SiH ingredient having only 3 silicon bonded hydrogen atoms per molecule, resulting in too few functional groups at each end of the polymer produced. The cyclic and neopentamer based examples in 21, 22 and 24 have a minimum of 3 functional groups at each end.

Example 25

In a 10 liter Turrello mixer equipped with a scrapper blade and two disperser blades 0.7 g of MEHQ was added to 3921 g of a masterbatch containing HMDZ treated filler in Polymer a5), 2608 g of Polymer a4), 115 g of SIH b2), and 438 g of cl) ATMS. The HMDZ treated filler was Cab-o-Sil MS-75 fumed silica. These ingredients were mixed for 10 minutes at RT. After this, 1.3 g of Pt catalyst were added and mixed a further 20 minutes at RT. The reaction was initiated by heating the mixer to 80° C. and maintaining for 1 hour. The mixer was cooled to 50° C., and 11.2 g of DAM were added. After this, 96 pts of the resulting product was mixed in a dental cup with 2 pts of methyltrimethoxysilane and 2 pts of PITA. This was cured at room temperature and humidity for 7 days to give a cured product with tensile stress values of 581 psi and elongation of 262%.

Example 26 Epoxy/Moisture Dual Cure

In a 1 quart Ross mixer 0.07 g of MEHQ was added to 788.44 g of a masterbatch containing HMDZ treated filler in Polymer a5), 11.1 g of SIH b2), 19.1 g of VCHO, and 2.1 g of c1) ATMS. The HMDZ treated filler was Cab-o-Sil MS-75 fumed silica. These ingredients were mixed for 10 minutes at RT. After this, 0.11 g of Pt catalyst was added and mixed a further 20 minutes at RT. The reaction was initiated by heating the mixer to 80° C. and maintaining for 1 hour. The mixer was cooled to 50° C. and 2 g of DAM were added.

Example 27 Epoxy/Moisture Dual Cure

In a 1 quart Ross mixer 0.07 g of MEHQ was added to 567.68 g of Polymer a5), 11.1 g of SIH b2), 19.1 g of VCHO, and 2.1 g of c1) ATMS. The HMDZ treated filler was Cab-o-Sil MS-75 fumed silica. These ingredients were mixed for 10 minutes at RT. After this, 0.11 g of Pt catalyst was added and mixed a further 20 minutes at RT. The reaction was initiated by heating the mixer to 80° C. and maintaining for 1 hour. The mixer was cooled to 50° C., and 1.2 g of DAM was added.

A catalyst mixture capable of catalyzing the thermal or UV cure of epoxy silicones was composed of a equal part mixture of Dow Corning® 2-7129 iodonium $SbF_6$ photoacid generator (available from Dow Corning Corporation of Midland, Mich., USA), Perkadox 16, Darocur 1173 and decyl alcohol. This catalyst mixture was added to the compositions in Table 17.

Mixing examples 26 and 27 gave samples of comparable polymer composition varying only in the level of treated filler present.

Tensile and lap shear adhesion against clad Al panels were measured as described above on samples cured at 80° C. for 15 minutes. Samples were also checked for UV cure by using a draw down bar to deposit 10 mil wet film thickness which cured with a single pass at 600 mJ/cm² irradiation from 300 watt Fusion H bulb.

TABLE 17

| Ingredient | Pts | Pts | Pts | Pts | Pts |
|---|---|---|---|---|---|
| Example 26 | 80 | 70 | 60 | 50 | 40 |
| Example 27 | 11.5 | 21.5 | 31.5 | 41.5 | 51.5 |
| Catalyst | 4 | 4 | 4 | 4 | 4 |
| UVA 15000 | 2.5 | 2.5 | 2.5 | 2.5 | 2.5 |
| Z6040 | 2 | 2 | 2 | 2 | 2 |
| Filler level | 22.4 | 19.6 | 16.8 | 14 | 11.2 |
| Tensile 80° C. 15 minutes | | | | | |
| avg. peak stress $lb_f/in^2$ | 751.96 | 806.65 | 642.5 | 538.15 | 533.82 |
| avg. peak strain % | 511.9 | 549.3 | 445.8 | 371.8 | 393.93 |
| Lap Shear Data clad Al | cohesive | Cohesive | cohesive | cohesive | cohesive |
| avg. peak stress $lb_f/in^2$ | 408.7 | 302.01 | 347.65 | 337.82 | 232.37 |
| avg. peak strain % | 28.47 | 29.23 | 31.9 | 27.55 | 22.97 |

Example 28

In a 1 quart Ross mixer 0.08 g of MEHQ was added to 401.78 g of a HMDZ treated filler masterbatch in Polymer a5), 384.29 g of Polymer a3), 25.5 g of SIH b2), 40.7 g of c4) AGE, and 10.2 g of cl) ATMS. The HMDZ treated filler was Cab-o-Sil MS-75 fumed silica. These ingredients were mixed for 10 minutes at RT. After this, 0.11 g of Pt catalyst were added and mixed a further 20 minutes at RT. The reaction was initiated by heating the mixer to 80° C. and maintaining for 1 hour. The mixer was cooled to 50° C., and 0.75 g of DAM was added.

Example 28 was combined with maleic anhydride and cured against clad Al substrates at 80° C. for 15 minutes, as described above. Lap shear adhesion testing was performed as described above. The amounts of each ingredient (pts) and the lap shear data are Table 18.

TABLE 18

| Example 28 | 95 | 85 |
|---|---|---|
| Maleic Anhydride | 3 | 13 |
| Lap Shear Data AlClad/AlClad 80° C./30 min | 100% cohesive | 100% cohesive |
| avg. peak stress $lb_f/in^2$ | 72 | 110 |
| avg. peak strain % | 16 | 15 |

Example 29

In a 1 quart Ross mixer 0.08 g of MEHQ was added to 297.62 g of a HMDZ treated filler masterbatch in Polymer a5), 408.85 g of Polymer a3), 35.4 g of SIH b2), 73.1 g of c2) AMA, 9.14 g of c3) VCHO, and 9.1 g of cl) ATMS. The HMDZ treated filler was Cab-o-Sil MS-75 fumed silica. These ingredients were mixed for 10 minutes at RT. After this, 0.11 g of Pt catalyst was added and mixed a further 20 minutes at RT. The reaction was initiated by heating the mixer to 80° C. and maintaining for 1 hour. The mixer was cooled to 50° C., and 0.75 g of DAM was added. The product of example 29 was combined with ingredients shown in Table 17 to form a composition. The composition was cured at 80° C. for 30 minutes between Al clad plates and then tested for lap shear. The lap shear data are in Table 19.

TABLE 19

| Example 29 | 60 |
|---|---|
| Varox ® DCBP | 1.8 |
| IBTMS | 2.4 |

TABLE 19-continued

| | |
|---|---|
| TBT | 0.15 |
| Perkadox 16 in SR297 (1:1) | 0.3 |
| SR297 | 0.3 |
| Maleic Anhydride | 1 |
| Lap Shear Data AlClad/AlClad 80° C./30 min | |
| avg. peak stress $lb_f/in^2$ | 389 |
| avg. peak strain % | 19 |

Example 30

In a 10 liter Turrello mixer equipped with a scrapper blade and two disperser blades 0.7 g of MEHQ was added to 4241 g of a masterbatch containing HMDZ treated filler in Polymer a5), 2095 g of Polymer a5), 213 g of SIH b2), 429g of c2) AMA and 212 g of c1) ATMS. The HMDZ treated filler was Cab-o-Sil MS-75 fumed silica. These ingredients were mixed for 10 minutes at RT. After this, 1.2 g of d) Pt catalyst were added and mixed a further 20 minutes at RT. The reaction was initiated by heating the mixer to 80° C. and maintaining for 1 hour. A clustered functional product was formed.

Example 31

The clustered functional product of example 30 was formulated into a composition. An amount of 88 g of the product was weighed into a dental mixer with 4 g of Sartomer SR239, 4 g of benzoylperoxide and 4 g of N,N dimethyl-p-toluidine, and mixed. Lap shear samples with a 40 mil bondline thicknesses were created using Al clad substrates. These samples were allowed to stand under ambient conditions overnight. After 24 hours, the 139 lbs/ins of tensile properties had developed with 23% elongation to break.

Examples 32-36

Formulations with Redox & Anaerobic Cure at RT

The clustered functional product of example 30 was formulated into compositions containing the ingredients in Table 20.

TABLE 20

| | Example | | | | |
|---|---|---|---|---|---|
| Ingredient | 32 Wt Pts | 33 Wt Pts | 34 Wt Pts | 35 Wt Pts | 36 Wt Pts |
| Clustered Functional Product of Example 30 | 92 | 88 | 92 | 92 | 100 |
| Lauroyl peroxide (Luperox ® LP) | 4 | | | | |
| 6N tert-Butyl hydroperoxide solution in Decane | | 8 | | | |
| Cumene hydroperoxide | | | 4 | | |
| DCBP | | | | 4 | |
| N,N-Dimethylaniline | 4 | 4 | 4 | 4 | |
| 3,5-dimethylpyrazole | | | | | 2 |
| Thioglycerol | | | | | 0.5 |
| vanadium acetyl-acetonate | | | | | 0.1 |
| Cured after mixing in dental cup then 10 min RT? | NO | NO | NO | YES | YES |
| Cured after 30 mins in 80° C. oven? | YES | YES | YES | | |

Example 37

In a 10 liter quart Turello mixer 0.3 g of BHT was added to 3233 g of a HMDZ treated fumed silica filler masterbatch in Polymer a5), 3232 g of Polymer a4), 168.9 g of SIH b2), 326.9 g of c2) AMA, and 105 g of c1) ATMS. The HMDZ treated filler was Cab-o-Sil MS-75 fumed silica. The ingredients were mixed for 10 minutes at RT. After this, 3.4 g of d) Pt catalyst were added and mixed a further 20 minutes at RT. The reaction was initiated by heating the mixer to 80° C. and maintaining for 1 hour. The resulting clustered functional product was cooled to 50° C., and 6 g of Inhibitor i) DAM was added.

Example 38

In a 1 quart Ross mixer 0.04 g of BHT was added to 399.4 g of Polymer a1), 90.9 g of SIH b2), 76.6 g of c2) AMA, and 183g of c1) ATMS. The ingredients were mixed for 10 minutes at RT. After this, 0.4 g of d) Pt catalyst were added and mixed a further 20 minutes at RT. The reaction was initiated by heating the mixer to 80° C. and maintaining for 1 hour. The resulting clustered functional product was cooled to 50° C., and 0.75 g of Inhibitor i) DAM was added.

Example 39

Compositions containing Clustered Functional Products of Examples 37 & 38

The clustered functional products of example 37 and 38 were formulated into a composition containing the ingredients in Table 21.

TABLE 21

| Ingredient | Wt. Pts. |
|---|---|
| Clustered Functional Product of Example 37 | 83.88 |
| Clustered Functional Product of Example 38 | 9.32 |
| Varox ® DCBP paste | 2.80 |
| Perkadox 16 | 0.47 |
| Isodecylmethacrylate | 0.47 |
| IBTMS | 0.47 |
| TBT | 0.47 |
| Silquest ® A186 | 0.93 |
| Aminopropyltrimethoxysilane | 0.19 |
| MgO (starmag cx-150) | 0.93 |
| Mercaptobenzothiazole | 0.09 |

Comparative Example 40

The composition of example 39 was coated on a set of electrodes. A control with no mercaptobenzothiazole corrosion inhibitor was also coated. The two sets of coated electrodes along with an uncoated electroded were wired and placed in a glass chamber containing flowers of sulfur. The glass chamber was place in a 80° C. oven. The electrical resistance of the silver electrodes was monitored using a Keithley Electrometer in resistance mode. The initial resistance of circal 5 to 10 ohms jumped to Mega ohms within 2 days of exposure for the control and the uncoated electrode. The electrodes also turned visibly black. The coatings containing the corrosion inhibitor had unchaged electrical resistance and appearance after 10 days of exposure.

Examples 41-49

Impact of Unsaturated Acids on Adhesion to Metals

The ingredients in table 22 were mixed in a dental mixer with the addition of a 23.4 mil spacer bead. The resulting compositions were applied to Al clad substrates and cured at 80° C. for 30 minutes. After 3 days at room temperature the resulting lap shear samples were tested. The ingredients, their amounts in weight parts, and lap shear test results are in table 22.

TABLE 22

|  | Example | | | | | | | | |
|---|---|---|---|---|---|---|---|---|---|
|  | 41 | 42 | 43 | 44 | 45 | 46 | 47 | 48 | 49 |
| Clustered Functional Product of Example 37 | 60 | 60 | 60 | 60 | 60 | 60 | 60 | 60 | 60 |
| IBTMS | 1.2 | 1.2 | 1.2 | 1.2 | 1.2 | 1.2 | 1.2 | 1.2 | 1.2 |
| Varox ® DCBP | 1.8 | 1.8 | 1.8 | 1.8 | 1.8 | 1.8 | 0.9 | 0.9 | 0.9 |
| Maleic Anhydride | 0 | 0.75 | 0 | 0 | 0 | 0 | 0 | 0 | 0 |
| Itaconic acid | 0 | 0 | 0.75 | 0 | 0 | 0 | 0 | 0 | 0 |
| Acrylic acid | 0 | 0 | 0 | 0.75 | 0 | 0 | 0 | 0 | 0 |
| Sartomer CD9050 | 0 | 0 | 0 | 0 | 0.75 | 0 | 0 | 0 | 0 |
| Methacrylic anhydride | 0 | 0 | 0 | 0 | 0 | 0.75 | 0 | 0 | 0 |
| Z6040 | 0 | 0 | 0 | 0 | 0 | 0 | 1.2 | 0 | 0 |
| Glycidyl methacrylate | 0 | 0 | 0 | 0 | 0 | 0 | 0 | 1.2 | 0 |
| Silquest A186 | 0 | 0 | 0 | 0 | 0 | 0 | 0 | 0 | 1.2 |
| TBT | 0.15 | 0.15 | 0.15 | 0.15 | 0.15 | 0.15 | 0.15 | 0.15 | 0.15 |
| IBTMS | 0.6 | 0.6 | 0.6 | 0.6 | 0.6 | 0.6 | 0.6 | 0.6 | 0.6 |
| Perkadox 16 | 0.3 | 0.3 | 0.3 | 0.3 | 0.3 | 0.3 | 0.3 | 0.3 | 0.3 |
| Sartomer SR297 | 0.3 | 0.3 | 0.3 | 0.3 | 0.3 | 0.3 | 0.3 | 0.3 | 0.3 |
| Test results | | | | | | | | | |
| Failure loci | 50% cohesive | 95% cohesive | 100% cohesive | 100% cohesive | 100% cohesive | 90% cohesive | 100% cohesive | 100% cohesive | 100% cohesive |
| avg. peak stress $lb_f/in^2$ | 463 | 595 | 560 | 643 | 469 | 537 | 488 | 657 | 525 |
| avg. peak strain % | 20 | 22 | 21 | 22 | 34 | 20 | 24 | 25 | 25 |

Comparative Example 50 and Examples 51-58

The ingredients in table 23 were mixed in a dental mixer with the addition of a 23.4 mil spacer bead. The resulting compositions were applied between Al clad and Cu coated FR4 substrates and cured at 80° C. for 30 minutes. After 3 days at room temperature the lap shear samples were tested. A second set of samples were placed in a pressure cooker at 2 atmosphere and 130° C. for 24 hours, after which they were subject to lap shear testing. The ingredients, their amounts, and the lap shear test results are in table 23. Examples 51-58 show that acrylate and methacrylate monomers can be used to further enhance the robustness of the adhesion.

TABLE 23

|  | Comparative | Example | | | | | | | |
|---|---|---|---|---|---|---|---|---|---|
|  | 50 | 51 | 52 | 53 | 54 | 55 | 56 | 57 | 58 |
| Clustered Functional Product from Example 37 | 60 | 60 | 60 | 60 | 60 | 60 | 60 | 60 | 60 |
| IBTMS | 1.2 | 1.2 | 1.2 | 1.2 | 1.2 | 1.2 | 1.2 | 1.2 | 1.2 |
| Varox ® DCBP | 1.8 | 1.8 | 1.8 | 1.8 | 1.8 | 1.8 | 1.8 | 1.8 | 1.8 |
| Acrylic acid | 0.25 | 0.25 | 0.25 | 0.25 | 0.25 | 0.25 | 0.25 | 0.25 | 0.25 |
| Sartomer SR489D | 0 | 0.5 | 0 | 0 | 0 | 0 | 0 | 0 | 0 |
| Sartomer SR395 | 0 | 0 | 0.5 | 0 | 0 | 0 | 0 | 0 | 0 |
| Sartomer SR257 | 0 | 0 | 0 | 0.5 | 0 | 0 | 0 | 0 | 0 |
| Sartomer SR506 | 0 | 0 | 0 | 0 | 0.5 | 0 | 0 | 0 | 0 |
| Sartomer SR285 | 0 | 0 | 0 | 0 | 0 | 0.5 | 0 | 0 | 0 |
| Sartomer SR833S | 0 | 0 | 0 | 0 | 0 | 0 | 0.5 | 0 | 0 |
| Sartomer SR238 | 0 | 0 | 0 | 0 | 0 | 0 | 0 | 0.5 | 0 |
| Sartomer SR351 | 0 | 0 | 0 | 0 | 0 | 0 | 0 | 0 | 0.5 |
| TBT | 0.15 | 0.15 | 0.15 | 0.15 | 0.15 | 0.15 | 0.15 | 0.15 | 0.15 |
| IBTMS | 0.6 | 0.6 | 0.6 | 0.6 | 0.6 | 0.6 | 0.6 | 0.6 | 0.6 |
| Perkadox 16 | 0.3 | 0.3 | 0.3 | 0.3 | 0.3 | 0.3 | 0.3 | 0.3 | 0.3 |
| Sartomer SR297 | 0.3 | 0.3 | 0.3 | 0.3 | 0.3 | 0.3 | 0.3 | 0.3 | 0.3 |
| Lap Shear Data AlClad/CuFR4 80° C./30 min | | | | | | | | | |
| avg. peak stress $lb_f/in^2$ | 592 | 500 | 566 | 635 | 634 | 610 | 552 | 469 | 410 |
| avg. peak strain % | 25 | 21 | 22 | 23 | 26 | 25 | 22 | 20 | 19 |
| Pressure Cooker 24 hrs | | | | | | | | | |

TABLE 23-continued

|  | Comparative | Example | | | | | | | |
| --- | --- | --- | --- | --- | --- | --- | --- | --- | --- |
|  | 50 | 51 | 52 | 53 | 54 | 55 | 56 | 57 | 58 |
| Lap Shear Data AlClad/CuFR4 80° C./30 min | | | | | | | | | |
| avg. peak stress $lb_f/in^2$ | 39 | 322 | 297 | 269 | 275 | 290 | 291 | 247 | 222 |
| avg. peak strain % | 15 | 23 | 15 | 17 | 16 | 17 | 22 | 15 | 17 |

Examples 59-64

Addition of Acid Acceptor

The ingredients in table 24 were mixed in a dental mixer with the addition of a 23.4 mil spacer bead. The resulting compositions were applied between Al clad substrates and cured at 80° C. for 30 minutes. After 3 days at room temperature, the resulting lap shear samples were tested by first immersing the samples in a 5 wt % NaCl solution placed in a oven at 80° C., after which they were subject to lap shear testing. The ingredients, their amounts and the lap shear testing results are in Table 24. The use of acid acceptor species was shown to reduce the impact of the peroxide breakdown products on the wet adhesion of Aluminum clad substrates.

TABLE 24

The amount of each ingredient is shown in weight parts.

|  | Example | | | | | |
| --- | --- | --- | --- | --- | --- | --- |
|  | 59 | 60 | 61 | 62 | 63 | 64 |
| Clustered functional product of ex. 37 | 60 | 60 | 60 | 60 | 60 | 60 |
| IBTMS | 1.2 | 1.2 | 1.2 | 1.2 | 1.2 | 1.2 |
| Varox ® DCBP | 1.8 | 1.8 | 1.8 | 1.8 | 1.8 | 1.8 |
| Star Mag CX-150 | 0 | 0.6 | 0 | 0 | 0 | 0 |
| MagOx 98LR | 0 | 0 | 0.6 | 0 | 0 | 0 |
| Rhenofit F | 0 | 0 | 0 | 0.6 | 0 | 0 |
| Star Mag CX-50 | 0 | 0 | 0 | 0 | 0.6 | 0 |
| BLP-3 | 0 | 0 | 0 | 0 | 0 | 0.6 |
| TBT | 0.15 | 0.15 | 0.15 | 0.15 | 0.15 | 0.15 |
| IBTMS | 0.6 | 0.6 | 0.6 | 0.6 | 0.6 | 0.6 |
| Perkadox 16 | 0.3 | 0.3 | 0.3 | 0.3 | 0.3 | 0.3 |
| Sartomer 297 | 0.3 | 0.3 | 0.3 | 0.3 | 0.3 | 0.3 |
| Lap Shear Data Al Clad 80° C./30 min | cohesive | cohesive | cohesive | cohesive | cohesive | cohesive |
| avg. peak stress $lb_f/in^2$ | 535 | 698 | 581 | 451 | 661 | 520 |
| avg. peak strain % | 21 | 20 | 20 | 19 | 21 | 20 |
| 5% NaCl Imersion | | | | | | |
| Lap Shear Data AlClad 80° C./30 min | cohesive | cohesive | cohesive | cohesive | cohesive | cohesive |
| avg. peak stress $lb_f/in^2$ | 498 | 603 | 640 | 649 | 585 | 564 |
| avg. peak strain % | 20 | 20 | 20 | 20 | 20 | 21 |

Example 65 and Comparative Examples 66-68

The ingredients in tables 25 and 26 were mixed in a dental mixer with the addition of a 23.4 mil spacer bead. The resulting compositions were cured in a chase at 80° C. for 15 minutes for tensile properties and between Al clad substrates and then tested for lap shear. Two sets of samples were prepared. One set was aged 3 days in a environmental chamber set at 25° C. and 50% relative humidity (RH), and another set was aged 3 days in an environmental chamber at 85° C. and 85% RH. The ingredients and their amounts, and the lap shear test results, are in tables 25 and 26. It can be seen for the ensuing tensile properties that the secondary moisture cure in this system significantly enhances the physical properties over the as cured materials.

TABLE 25

| Ingredient | Weight Pts. |
| --- | --- |
| Clustered functional product from example 37 | 91 |
| SR297 | 2 |
| Perkadox 16 | 2 |
| PITA | 2 |
| IBTMS | 1 |
| Z6040 | 2 |
| Zr(acac)4 | 0.1 |

TABLE 25-continued

| Tensile Properties | Initial | 3 days in 25° C./50% RH then 85° C./85 RH 1 day | 3 days 85° C./85 RH |
| --- | --- | --- | --- |
| avg. peak stress $lb_f/in^2$ | 384.38 | 406.98 | 484.39 |
| High | 394.09 | 414.46 | 522.13 |
| low | 374.66 | 399.5 | 451.9 |
| avg. peak strain % | 298.52 | 259.2 | 300.2 |
| High | 301.18 | 265.06 | 321.56 |
| Low | 295.87 | 253.35 | 289.27 |

TABLE 26

|  | Comparative Example | | |
|---|---|---|---|
|  | 66 Wt. Pts. | 67 Wt. Pts. | 68 Wt. Pts. |
| Ingredient | | | |
| Masterbatch of 90% Polymer a5) with filler (Cab-o-sil MS75) | 93 | 93 | 93 | out acrylic acid additives were tested with several substrates using lap shear after curing at 80° C. for 30 minutes. The composition and test results are given in the following table.

Three of each sample was prepared and cured at 80° C. for 30 minutes between polybutylene terephthalate (PBT) substrates from Ticona Alumimum and copper coated FR4 boards. Each sample had a 1 inch bondline with 23.4 mil spacer beads. Samples were tested for lap shear, and the results are in table 27.

TABLE 27

| Example | Composition | | Thermal Conductivity, W/mK | Lap Shear Testing Results | Cure Conditions | | |
|---|---|---|---|---|---|---|---|
|  |  |  |  |  | 80° C./30 mins PBT TICONNA 33000 | 80° C./30 mins Al Clad on Al Clad | 80° C./30 mins Cu FR4 on CuFR4 |
| 69 | Base | Additive | 1.2 | Failure mode | 100% cohesive | 0% cohesive | 0% cohesive |
| Base | 20 g |  |  | avg. peak stress $lb_f/in^2$ | 75 | 50 | 90 |
|  |  |  |  | avg. peak strain % | 10% | 5 | 11 |
| 70 |  |  |  | Failure mode | 100% cohesive | 20% cohesive | 100% cohesive |
| Base | 20 g |  |  | avg. peak stress $lb_f/in^2$ | 111 | 118 | 134 |
| SR 297 |  | 0.1 g |  | avg. peak strain % | 10% | 9 | 11 |
| 71 |  |  |  | Failure mode | 0% cohesive | 80% cohesive | 10% cohesive |
| Base | 20 g |  | 1.23 | avg. peak stress $lb_f/in^2$ | 210 | 305 | 253 |
| Acrylic acid |  | 0.1 g |  | avg. peak strain % | 13% | 12 | 16 |

TABLE 26-continued

|  | Comparative Example | | |
|---|---|---|---|
|  | 66 Wt. Pts. | 67 Wt. Pts. | 68 Wt. Pts. |
| Perkadox 16 | 2 | 2 | 2 |
| SR203 | 5 | 0 | 0 |
| Triallylisocyanurate (TAIC) | 0 | 5 | 0 |
| (Methacryloyloxy)propyl]trimethoxysilane | 0 | 0 | 5 |
| Lap Shear Data 80° C./15 mins Clad Al | | | |
| avg. peak stress $lb_f/in^2$ | 155.5 | 219.26 | 203.48 |
| High | 167.4 | 232.3 | 214.94 |
| Low | 143.5 | 206.23 | 192.03 |
| avg. peak strain % | 22.4 | 22.82 | 27.37 |
| High | 22.5 | 23.41 | 29.37 |
| Low | 22.2 | 22.22 | 25.36 |

Examples 69-71 Thermally Conductive Compositions

A sample of 156 g of the clustered functional polyorganosiloxane prepared in example 7 was charged to a 1 quart mixer, and 0.02 g benzoquinol and 16.16 g decyl trimethoxy silane, $CH_3(CH_2)_9Si(O\ CH_3)_3$, were added and mixed for 5 minutes at room temperature. Samples of 507.6 g of CBA 05S and 507.6 g of CBA 20S alumina fillers were added and mixed at room temperature for 65 minutes. CBA 05S was 5 micron alumina filler from Showa Denko America Inc., of New York, N.Y., USA. CBA 20S was 20 micron alumina filler, also from Showa Denko. The mixer was then heated (with steam) at temperatures ranging from 70° C. to 75° C. for 60 minutes. This sample was used as a masterbatch for below formulation study.

Samples of 0.92 g DCBP initiator and 181 g of masterbatch prepared as described above was mixed twice in a 100 mL dental cup using a dental mixer at 2200 rpm for 30 second. 20 grams of the resulting material was then mixed with 0.1 g of SR 297 and 0.1 g of acrylic acid, respectively. The adhesion properties of the compositions with and with-

Example 72

In a 1 liter glass resin kettle fitted with a condenser, mechanical stirrer, and thermocouple the following ingredients were added: 427.7 parts (pts) of Polymer a2), 26.4 pts of SIH b2), 46.0 pts of c2) AMA, and 0.05 pts of PTZ. The resulting mixture was stirred at RT for 10 minutes until the mixture was homogeneous. After this, 0.09 pts of d) Pt catalyst was added, and the mixture was stirred at RT for 20 minutes. The reaction was initiated by increasing the mixer temperature to 80° C. The reaction was monitored by measuring the reduction of the SiH peak at 2173 $cm^{-1}$ in the Fourier Transform Infra-Red (FT-IR). Typical reaction time was 1 hour.

Example 73

Organoborane Curable Composition

An amount of 8 g of the clustered functional polyorganosiloxane prepared in example 72 was mixed in a dental cup with 0.1 g tri-n-butyl borane methoxypropylamine (TnBB-MOPA) complex. On the addition of a decomplexing agent (0.11 g isophorone diisocyanate, IPDI), TnBB-MOPA radicals suitable for reaction of meth(acrylate) based materials that showed utility in grafting to polymeric substrates were formed and the composition cured within 25 seconds. The ingredients, amounts and cure results are shown in Table 28.

TABLE 28

| Ingredient | Wt. Pts. |
|---|---|
| Clustered functional polyorganosiloxane prepared in example 72 | 8.0 |
| tri-n-butyl borane methoxypropylamine (TnBB-MOPA) complex | 0.11 |
| Isophorone diisocyanate | 0.11 |
| Cure results | Cures within 20 secs |

Examples 73-77 and Comparative Example 78

Lap shear samples containing the ingredients in Table 29 were coated onto Al clad combined with Cu coated FR4 and Al clad and Nickel coated copper substrates for testing. All samples were cured at 90° C. for 30 minutes. The initial data shows the as cured samples' tensile properties and the percentage cohesive failure, with 100% being the most desirable. Samples were also subjected to accelerated testing by placing them in a pressure cooker at 2 atmospheres and 120° C. for 24 hours and retested. This is a harsh test of the adhesion.

TABLE 29

|  | Control 78 | 73 | 74 | 75 | 76 | 77 |
|---|---|---|---|---|---|---|
| Clustered functional product from example 37 | 100 | 100 | 100 | 100 | 100 | 100 |
| Varox ® DCBP | 4 | 4 | 4 | 4 | 4 | 4 |
| PITA | 0.5 | 0.1 | — | — | — | — |
| TBT | — | — | 0.5 | 0.5 | 0.5 | 0.5 |
| IBTMS | 1 | 1 | 1 | 1 | 1 | 1 |
| Silquest A186 | — | 0.1 | — | 0.1 | — | — |
| Aminopropyl-trimethoxysilane | 0.1 | 0.1 | 0.1 | 0.1 | 0.1 | 0.1 |
| Z6040 | — | — | — | — | 0.1 | 0.1 |
| Zirconium (IV) 2,4-pentanedionate | — | — | — | — | — | 0.1 |
| Magnesium oxide (starmag cx-150 from Merrand International Corp.) | 1 | 1 | 1 | 1 | 1 | 1 |
| Mercaptobenzothiazole | 0.1 | 0.1 | 0.1 | 0.1 | 0.1 | 0.1 |
| Initial results |  |  |  |  |  |  |
| Lap Shear Data CuFR4/AlClad 90° C./30 min | 40% | 70% | 60% | 75% | 80% | 75% |
| avg. peak stress $lb_f/in^2$ | 201 | 277 | 255 | 375 | 389 | 340 |
| Al Cu Aged Lap Shear Data 90° C./ 30 min + Pressure cooker 24 hr | 60% | 70% | 85% | 100% | 100% | 100% |
| avg. peak stress $lb_f/in^2$ | 342 | 354 | 437 | 384 | 421 | 447 |
| Ni Aged Lap Shear 90° C./30 min + Pressure cooker 24 hr | 50% | 100% | 100% | 100% | 100% | 100% |
| avg. peak stress $lb_f/in^2$ | 170 | 331 | 286 | 381 | 394 | 354 |

The improvement in tensile and wet adhesive properties is seen in the compositions of examples 73 to 77 containing adhesion promoters, as compared to the control.

Industrial Applicability

The process of this invention represents an improvement over prior art processes in that the number of process steps required to product the clustered functional polyorganosiloxane is reduced. There is no intermediate purification or catalyst deactivating step when creating a reaction product of ingredient a) and ingredient b) with ingredient c). Furthermore the process allows for incorporation of a filler without detrimentally affecting viscosity and other handling properties of the clustered functional polyorganosiloxane product of the process.

A curable adhesive composition containing the clustered functional polyorganosiloxane may provide the advantage of being self-adhesive (i.e., forming adhesion to the substrates above, when unprimed), even when cured at relatively low temperature (e.g., 80° C. or less). The curable silicone composition may further provide the benefit of relatively fast tack free time for electronics industry applications, as compared to curable silicone compositions that do not contain the clustered curable polymer prepared by the process described above.

The invention claimed is:

1. A process comprising:
 1) concurrently reacting ingredients comprising
  a) a polyorganosiloxane having an average per molecule of at least 2 aliphatically unsaturated organic groups,
  b) a polyorganohydrogensiloxane having an average, per molecule, of 4 to 15 silicon atoms and at least 4 silicon bonded hydrogen atoms per aliphatically unsaturated organic group in ingredient a), and
  c) a reactive species having, per molecule at least one aliphatically unsaturated organic group and one or more curable groups;
 in the presence of d) a hydrosilylation catalyst; and
  optionally one of e) a filler, f) a non-reactive silicone resin, or a combination thereof; and
  further optionally g) a chain extender, h) an endcapper, or both;
 with the proviso that a ratio of
 silicon bonded hydrogen atoms in ingredient b) divided by the number of aliphatically unsaturated organic groups in ingredient a) (the $SiH_b/Vi_a$ ratio)
 ranges from 4/1 to 20/1 and a product prepared by the process has more than one curable group at each terminus of the polyorganosiloxane of ingredient a) and where ingredient c) provides two or more different types of curable groups and the product is deemed a multiple cure clustered functional polyorganosiloxane; and
 optionally 2) adding a catalyst inhibitor, and
 when step 2) is present, further optionally 3) purifying the product of step 2).

2. The process of claim 1, where ingredient a) and ingredient b) are present in amounts sufficient to provide the $SiH_b/Vi_a$ ratio with a value ranging from 4/1 to 10/1.

3. The process of claim 1 where the filler is present, and the filler is added by a method comprising: mixing the filler, a filler treating agent, and all or a portion of ingredient a) before step 1).

4. The process of claim 1, where ingredient a) has a formula selected from the group consisting of formula (I), formula (II), and a combination thereof, where
 formula (I) is $R^1_2R^2SiO(R^1_2SiO)_a(R^1R^2SiO)_bSiR^1_2R^2$,
 formula (II) is $R^1_3SiO(R^1_2SiO)_c(R^1R^2SiO)_dSiR^1_3$;
 each $R^1$ is independently a monovalent organic group free of aliphatic unsaturation,
 each $R^2$ is independently an aliphatically unsaturated organic group,
 subscript a has an average value ranging from 2 to 1000,
 subscript b has an average value ranging from 0 to 1000,
 subscript c has an average value ranging from 0 to 1000, and
 subscript d has an average value ranging from 4 to 1000;
 with the provisos that $10 \leq (a+b) \leq 1000$ and $10 \leq (c+d) \leq 1000$.

5. The process of claim 1, where ingredient b) is selected from:
 i) a cyclic polyorganohydrogensiloxane;
 ii) a branched polyorganohydrogensiloxane;

iii) a linear polyorganohydrogensiloxane having an average of at least 4 silicon bonded hydrogen atoms per molecule;
iv) a polyorganohydrogensiloxane having formula (III), where formula (III) is $(R^3_2SiO_{2/2})_e(HR^3SiO_{2/2})_f$, where
each $R^3$ is independently a monovalent organic group free of aliphatic unsaturation,
subscript e has an average value ranging from 0 to 10,
subscript f has an average value ranging from 3 to 12, and
a sum (e +f) has a value ranging from 3 to 12;
v) a polyorganohydrogensiloxane having formula (IV), where formula (IV) is $Si-(OSiR^4_2)_g(OSiHR^4)_{g'}(OSiR^4_3H)_h(OSiR^4_2H)_{(4-h)}$, where
each $R^4$ is independently a monovalent organic group free of aliphatic unsaturation,
subscript g has a value ranging from 0 to 10,
subscript g' has a value ranging from 0 to 10, and
subscript h has a value ranging from 0 to 1;
with the proviso that when subscript g' is 0, then subscript h is also 0;
vi) a polyorganohydrogensiloxane having formula (V), where formula (V) is $^{SiR}R^5_2HSiO(R^5_2SiO)_i(R^5HSiO)_jSiR^5_2H$, where
each R5 is independently a monovalent organic group free of aliphatic unsaturation,
subscript i has an average value ranging from 1 to 12,
subscript j has an average value ranging from 2 to 12, and
a sum (i +j) has a value ranging from 4 to 13;
vii) a polyorganohydrogensiloxane having formula (VI), where formula (VI) is $R^5_3SiO(R^5_2SiO)_k(R^5HSiO)_m SiR^5_3$, where each $R^5$ is as defined above and
subscript k has an average value ranging from 0 to 12,
subscript m has an average value ranging from 4 to 12, and
a sum (k +m) has a value ranging from 4 to 13; and
viii) a combination of polyorganohydrogensiloxanes having formula (V) and formula (VI).

6. The process of claim 1, where the curable groups on ingredient c) are selected from acrylate, alkoxy, epoxy, methacrylate, and combinations thereof.

7. The process of claim 1, where ingredient c) comprises two or more reactive species, and the two or more reactive species have two or more different curable groups.

8. The process of claim 1, where ingredient c) comprises compounds selected from:
(i) two or more silanes of formula (VII), where formula (VII) is $R^6_n SiR^7_{(4-n)}$; where
each subscript n independently has a value ranging from 1 to 3,
each $R^6$ is independently an alkenyl group or an alkynyl group, and
each $R^7$ is independently selected from an acrylate group, an alkoxy group, an epoxy group, and a methacrylate group;
with the proviso that at least one $R^7$ group on one silane differs from at least one other $R^7$ group on another silane;
(ii) a silane of formula (VIII), where formula (VIII) is $R^8_o SiR^9_{(4-o)}$; where
subscript o is has a value ranging from 1 to 3,
each $R^8$ is independently an alkenyl group or an alkynyl group, and
each $R^9$ is independently selected from an acrylate group, an alkoxy group, an epoxy group, and a methacrylate group; and
(iii) an organic compound having an average, per molecule, of
1 to 2 alkenyl or alkynyl groups, and one or more reactive groups selected from an acrylate group, an alkoxy group, an epoxy group, and a methacrylate group.

9. The process of claim 3, wherein the mixing the filler, a filler treating agent, and all or a portion of ingredient a) before step 1) forms a masterbatch that is a combination of a treated filler in the polyorganosiloxane of ingredient a).

10. The process of claim 1, where the curable groups on ingredient c) are selected from isocyanate and urethane.

* * * * *